(12) United States Patent
Bermeister

(10) Patent No.: US 10,999,617 B2
(45) Date of Patent: May 4, 2021

(54) SYSTEM AND METHOD FOR DELIVERING MULTIMEDIA CONTENT

(71) Applicant: YALLA.DIGITAL, INC., Sherman Oaks, CA (US)

(72) Inventor: Kevin Bermeister, Sydney (AU)

(73) Assignee: YALLA.DIGITAL, INC., Sherman Oaks, CA (US)

( * ) Notice: Subject to any disclaimer, the term of this patent is extended or adjusted under 35 U.S.C. 154(b) by 0 days.

(21) Appl. No.: 16/988,573

(22) Filed: Aug. 7, 2020

(65) Prior Publication Data

US 2021/0029393 A1    Jan. 28, 2021

Related U.S. Application Data

(63) Continuation of application No. PCT/IB2019/050657, filed on Jan. 28, 2019.

(60) Provisional application No. 62/629,568, filed on Feb. 12, 2018, provisional application No. 62/672,979, filed on May 17, 2018.

(51) Int. Cl.
*H04N 21/258* (2011.01)
*H04N 21/2343* (2011.01)
*H04N 21/242* (2011.01)

(52) U.S. Cl.
CPC . *H04N 21/25841* (2013.01); *H04N 21/23439* (2013.01); *H04N 21/242* (2013.01)

(58) Field of Classification Search
None
See application file for complete search history.

(56) References Cited

U.S. PATENT DOCUMENTS

| | | | |
|---|---|---|---|
| 9,918,199 B2* | 3/2018 | Rouda, Jr. | H04W 4/027 |
| 10,142,795 B2* | 11/2018 | Colosky | H04L 67/306 |
| 10,264,402 B2* | 4/2019 | Davidsson | H04W 4/029 |
| 2010/0063726 A1* | 3/2010 | Marjenberg | G01C 21/00 |
| | | | 701/408 |
| 2012/0122570 A1 | 5/2012 | Baronoff | |
| 2014/0136100 A1 | 5/2014 | Drysdale | |
| 2017/0069141 A1 | 3/2017 | Carter et al. | |

OTHER PUBLICATIONS

WIPO, International Search Report received in International Application No. PCT/IB2019/050657, dated Jun. 2, 2019, (3p.).
WIPO, International Written Opinion received in International Application No. PCT/IB2019/050657, dated Jun. 2, 2019, (6p.).
WIPO, International Preliminary Report on Patentability received in International Application No. PCT/IB2019/051593, dated Aug. 18, 2020, (7p.).

* cited by examiner

*Primary Examiner* — James R Marandi
(74) *Attorney, Agent, or Firm* — Siritzky Law, PLLC

(57) ABSTRACT

A framework for presenting aspects of a story to one or more participants having at least one device, the story having one or more storylines, each storyline comprising one or more segments, each segment comprising one or more elements, each of said one or more elements comprising (i) a physical location; (ii) actions; and (iii) at least one event trigger, said framework comprising a backend platform storing information about said story and interacting with said at least one device to deliver aspects of at least one of said storylines to at least some of said one or more participants based on one or more event triggers.

18 Claims, 10 Drawing Sheets

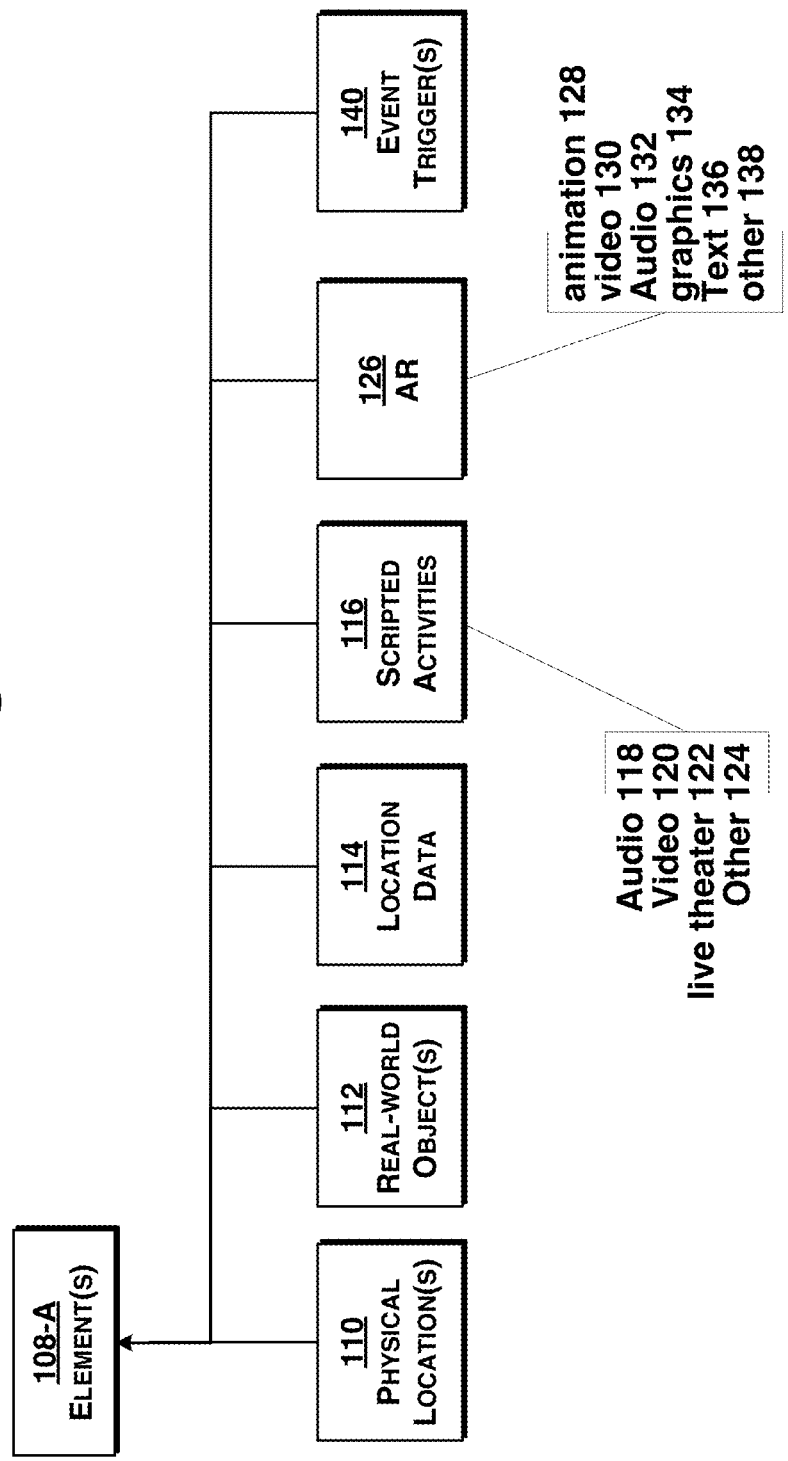

SYSTEM AND METHOD FOR DELIVERING MULTIMEDIA CONTENT

RELATED APPLICATIONS

This application is a continuation of PCT/IB2019/050657, filed Jan. 28, 2019, which claims the benefit of U.S. patent application No. 62/629,568, filed Feb. 12, 2018; and application No. 62/672,979, filed May 17, 2018, the entire contents of each of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention generally relates to the delivery of multimedia content, and in particular, to a system and method for delivering multimedia content to one or more participants at one or more physical locations.

BACKGROUND

Providing audio recordings to tour groups, museum patrons, and the like is a useful way to provide information to the guests. For example, many museums offer portable audio devices with headphones that the patrons may rent to listen to informative audio recordings as they wander through the galleries. The provided recordings may lend insight into each piece of artwork, and in doing so, may lead the patron through the exhibit.

In more sophisticated set-ups, the portable audio devices may allow the user to input where they are in the museum (e.g., each piece of art may have a number or bar code next to it that the user can enter or scan into the device). The device may then play the segment of audio specifically recorded for each particular piece of art. In this way, the device may rely on the user to let it know where he/she may be physically located. However, other than entering in the artwork number, there is little else in the way of interactivity between the patron and the device.

The audio players may be self-contained, and as such, may only provide the audio to the particular user who may be operating the device. The audio recordings do not provide visual information, and are thus limited in the information they can provide. Dramatic effects provided by audio recordings are also very limited.

Visual types of media such as video, augmented reality (AR) and/or live theater are known to provide visual and dramatic effects to viewers. However, these types of media are typically delivered to viewers in the form of entertainment and are not delivered or presented simultaneously to groups of people in settings such as museums, or to tour groups at particular physical locations.

Accordingly, there is a need for a system that may deliver pre-scripted, dramatic media such as audio, video, augmented reality and/or live theater simultaneously to groups of people at particular physical locations.

There is also a need for a system to provide increased interactivity between the system and the participants so that media may be managed, triggered and delivered dynamically.

There is also a need for a master control system to manage delivery of the media to groups of participants simultaneously.

It is desirable, and an object of this invention, to provide such a system.

SUMMARY

The present invention is specified in the claims as well as in the description.

Those of ordinary skill in the art will appreciate and understand, upon reading this description, that embodiments hereof provide a technique for touring locations that combines a pre-planned touring schedule, synchronized to pre-recorded dramatization, enhanced with augmented reality and live theatre. One or more participants of the touring group may receive an application on a device (or download it to their devices). The device may controlled by the tour guide to trigger delivery of content to the participant device(s).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a framework for presenting aspects of a story to one or more participants, the one or more participants having at least one device. The framework may also include the story having one or more storylines, each storyline including one or more segments, each segment including one or more elements, each of the one or more elements including (i) a physical location; (ii) actions; and (iii) one or more event triggers. The framework may also include the framework including a backend platform storing information about the story and interacting with the at least one device of the one or more participants to deliver aspects of at least one of the storylines to at least some of the one or more participants, where the aspects of the at least one of the storylines are delivered to the participants based on one or more event triggers. Other embodiments of this aspect include corresponding computer systems, apparatus, and computer programs recorded on one or more computer storage devices, each configured to perform the actions of the methods.

Implementations may include one or more of the following features:

The framework where at least one of the elements includes or is associated with at least one real-world object.

The framework where at least one of the elements includes or is associated with one or more scripted activities.

The framework where the one or more scripted activities include one or more of: (i) audio activities; and (ii) video activities.

The framework where the one or more scripted activities include live acting theater.

The framework where at least one of the elements includes or is associated with one or more augmented reality (AR) content.

The framework where the one or more AR content includes one or more of: (i) animation content; (ii) video content; (iii) audio content; (iv) graphics content; and (v) text content.

The framework where at least some of the one or more event triggers are location-based.

The framework where a particular location-based event trigger is associated with a particular physical location, and where the particular location-based event trigger is triggered based on a number of participants in the one or more participants being within a predetermined distance from the physical location.

The framework where the particular location-based event trigger is triggered based on when at least one participant in the one or more participants is within a predetermined distance from the physical location.

The framework where the particular location-based event trigger is triggered based on whether at least a certain percentage of the one or more participants are within the predetermined distance from the physical location.

The framework where the particular location-based event trigger is triggered when fewer than all participants of the one or more participants are within the predetermined distance from the physical location.

The framework where the particular location-based event trigger is triggered manually.

The framework where the particular location-based event trigger is triggered based on information provided by the backend platform.

The framework where the particular location-based event trigger is triggered automatically.

The framework where at least one physical location includes an outdoor location.

The framework where at least one physical location includes an indoor location.

The framework where at least one physical location includes a vehicle.

The framework where at least one physical location includes a path or road between two other physical locations.

The framework where the aspects of at least one of the storylines are delivered to the at least some of the participants in real-time.

The framework where the aspects of at least one storyline are delivered simultaneously to multiple devices associated with the one or more participants.

The framework where the aspects of at least one storyline are delivered synchronously to the multiple devices.

The framework where the one or more elements are presented sequentially.

The framework where the one or more participants have multiple devices.

The framework where the one or more participants have at least three devices.

The framework where the one or more participants includes at least three participants, and where the one or more participants has at least three devices.

The framework where the backend platform delivers at least some of the at least one of the storylines to devices of the one or more participants prior to any of the one or more event triggers.

The framework where the backend platform delivers all of the at least one of the storylines to devices of the one or more participants prior to any of the one or more event triggers.

The framework where the backend platform delivers at least some of the at least one of the storylines to devices of the one or more participants in response to at least one of the one or more event triggers.

The framework where the backend platform delivers files including storylines to devices of the one or more participants.

The framework where the aspects of at least one of the storylines are pre-loaded into at least one device.

The framework where at least some of the one or more event triggers are evaluated on a device.

The framework where all of the one or more event triggers are evaluated on a device.

The framework where at least some of the one or more event triggers are evaluated on the backend platform.

The framework where all of the one or more event triggers are evaluated on the backend platform.

The framework where at least one of the one or more event triggers is triggered manually.

The framework where at least one of the one or more event triggers is triggered automatically.

The framework where each the at least one device includes a device selected from: (i) a smartphone, (ii) a tablet computer, (iii) a portable audio device, (iv) a portable video device, (v) AR glasses, (vi) an AR headset; and (vii) a virtual reality headset.

The framework where the one or more participants have multiple homogenous devices.

The framework where the one or more participants have multiple devices, and at least two of the devices are different types.

The framework where less than the entire story is presented to at least some of the one or more participants.

The framework where at least one entire storyline is presented to at least some of the one or more participants.

The framework where at least one storyline is presented differently to different participants in the one or more participants.

The framework where at least one storyline is presented in a different order to different participants in the one or more participants.

The framework where at least one storyline is presented in the same manner to all participants in the one or more participants.

The framework where the backend platform maintains information about presentation of the aspects of the story to the one or more participants.

The framework where the information maintained by the backend platform includes information about which aspects of the story have been delivered to which participants of the one or more participants.

The framework where the information maintained by the backend platform is used to control delivery of the aspects of the at least one of the storylines.

The framework where the backend platform includes a master control system.

The framework where the backend platform manages delivery of the aspects of the story to the participants in the one or more participants simultaneously.

The framework where the aspects of the story include content associated with the story.

The framework where the one or more participants include exactly one participant.

The framework where the one or more participants include more than one participant.

The framework where the one or more participants include a group.

Implementations of the described techniques may include hardware, a method or process, or computer software on a computer-accessible medium.

Another general aspect includes a method, in a framework for presenting aspects of a story to a one or more participants, the one or more participants having at least one device. The method may also include the story having one or more storylines, each storyline including one or more segments, each segment including one or more elements, each of the one or more elements including (i) a physical location; (ii) actions; and (iii) one or more event triggers. The method may also include the framework including a backend platform storing information about the story and interacting with the at least one device of the one or more participants, the method including. The method may also include (a) evaluating one or more event triggers. The method may also include (b) in response to the evaluating, delivering aspects of at least one of the storylines to at least some of the one or more participants. Other embodiments of this aspect include corresponding computer systems, apparatus, and computer programs recorded on one or more computer storage devices, each configured to perform the actions of the methods.

Implementations may include one or more of the following features:

The method where at least one of the elements includes or is associated with one or more scripted activities, and where the delivering includes: (a) delivering one or more scripted activities.

The method where the one or more scripted activities include live acting theater. The method, where at least one of the elements includes or is associated with augmented reality content, and where the delivering includes: (a) delivering at least some of the AR content.

The method where the AR content includes one or more of: (i) animation content; (ii) video content; (iii) audio content; (iv) graphics content; and (v) text content.

The method where at least some of one or more event triggers are location-based.

The method where a particular location-based event trigger is associated with a particular physical location, and where the particular location-based event trigger is triggered based on a number of participants in the one or more participants being within a predetermined distance from the physical location.

The method where the particular location-based event trigger is triggered based on when at least one of the one or more participants is within a predetermined distance from the physical location.

The method where the particular location-based event trigger is triggered based on whether at least a certain percentage of the one or more participants are within the predetermined distance from the physical location.

The method where the particular location-based event trigger is triggered when fewer than all of the one or more participants are within the predetermined distance from the physical location.

The method where the particular location-based event trigger is triggered based on information provided by the backend platform.

The method further including: manually triggering the particular location-based event trigger.

The method further including: automatically triggering the particular location-based event trigger.

The method, where at least one physical location includes an outdoor location.

The method, where at least one physical location includes an indoor location.

The method, where at least one physical location includes a vehicle.

The method where at least one physical location includes a path or road between two other physical locations.

The method where the aspects of at least one storyline are delivered to the at least some of the participants in real-time.

The method where the aspects of at least one storyline are delivered simultaneously to multiple devices associated with the one or more participants.

The method where the aspects of at least one storyline are delivered synchronously to the multiple devices.

The method where one or more elements are presented sequentially.

The method where the one or more participants have multiple devices.

The method where the one or more participants have at least three devices.

The method where the one or more participants includes at least three participants, and where the one or more participants have at least three devices.

The method where the backend platform delivers at least some of the at least one of the storylines to devices of the one or more participants prior to any of the one or more event triggers.

The method where the backend platform delivers all of the at least one of the storylines to devices of the one or more participants prior to any of the one or more event triggers.

The method where the backend platform delivers at least some of the at least one of the storylines to devices of the one or more participants in response to at least one of the one or more event triggers.

The method where the backend platform delivers files including storylines to devices of the one or more participants.

The method where the aspects of at least one of the storylines are pre-loaded into at least one device.

The method where at least some of the one or more event triggers are evaluated on a device.

The method where all of the one or more event triggers are evaluated on a device.

The method where at least some of the one or more event triggers are evaluated on the backend platform.

The method where all of the one or more event triggers are evaluated on the backend platform.

The method where at least one of the one or more event triggers is triggered manually.

The method where at least one of the one or more event triggers is triggered automatically.

The method where each the at least one device includes a device selected from: (i) a smartphone, (ii) a tablet computer, (iii) a portable audio device, (iv) a portable video device, (v) AR glasses, (vi) an AR headset; and (vii) a virtual reality headset.

The method where the one or more participants have multiple devices, and at least two of the devices are different types.

The method where the one or more participants have multiple homogenous devices.

The method where less than the story is presented to at least some of the one or more participants.

The method where at least one entire storyline is presented to at least some of the one or more participants.

The method where at least one storyline is presented differently to different participants in the one or more participants.

The method where at least one storyline is presented in a different order to at least two different participants in the one or more participants.

The method where at least one storyline is presented in the same manner to all participants in the one or more participants.

The method where the backend platform maintains information about presentation of the aspects of the story to the one or more participants.

The method where the information maintained by the backend platform includes information about which aspects of the story have been delivered to which participants of the one or more participants.

The method where the information maintained by the backend platform is used to control delivery of the aspects of the at least one of the storylines.

The method where the backend platform includes a master control system.

The method where the backend platform manages delivery of the aspects of the story to the participants in the one or more participants simultaneously.

The method where at least one of the elements includes or is associated with at least one real-world object.

The method further including: repeating acts (a) and (b) for multiple event triggers.

The method where the repeating occurs at multiple physical locations.

The method where the aspects of the story include content associated with the story.

The method where the one or more participants exactly one participant.

The method where the one or more participants include more than one participant.

The method where the one or more participants include a group.

The method where the one or more scripted activities include one or more of: (i) audio activities; and (ii) video activities.

Implementations of the described techniques may include hardware, a method or process, or computer software on a computer-accessible medium.

Below, further numbered embodiments of the invention will be discussed.

Below is a list of framework (or system) embodiments. Those will be indicated with a letter "F". Whenever such embodiments are referred to, this will be done by referring to "F" embodiments.

F1. A framework for presenting aspects of a story to one or more participants, the one or more participants having at least one device,
  the story having one or more storylines, each storyline comprising one or more segments, each segment comprising one or more elements, each of the one or more elements comprising (i) a physical location; (ii) actions; and (iii) at least one event trigger,
  the framework comprising a backend platform storing information about the story and interacting with the at least one device of the one or more participants to deliver aspects of at least one of the storylines to at least some of the one or more participants, wherein the aspects of the at least one of the storylines are delivered to the participants based on one or more event triggers.

F2. The framework according to the previous framework, wherein at least one of the elements includes or is associated with at least one real-world object.

F3. The framework according to the previous frameworks, wherein at least one of the elements includes or is associated with one or more scripted activities.

F4. The framework according to the previous framework, wherein the one or more scripted activities comprise one or more of: (i) audio activities; (ii) video activities.

F5. The framework according to the previous frameworks, wherein the one or more scripted activities comprise live acting theater.

F6. The framework of any one of the preceding frameworks, wherein at least one of the elements includes or is associated with one or more augmented reality (AR) content.

F7. The framework according to the previous frameworks, wherein the one or more AR content comprises one or more of: (i) animation content; (ii) video content; (iii) audio content; (iv) graphics content; and (v) text content.

F8. The framework of any one of the preceding frameworks, wherein at least some of the event triggers are location-based.

F9. The framework according to the previous framework, wherein a particular location-based event trigger is associated with a particular physical location, and wherein the particular location-based event trigger is triggered based on a number of participants in the one or more participants being within a predetermined distance from the physical location.

F10. The framework according to the previous framework, wherein the particular location-based event trigger is triggered based on when at least one participant in the one or more participants is within a predetermined distance from the physical location.

F11. The framework according to the previous framework F9, wherein the particular location-based event trigger is triggered based on whether at least a certain percentage of the one or more participants are within the predetermined distance from the physical location.

F12. The framework according to the previous frameworks F9 to F11 wherein the particular location-based event trigger is triggered when fewer than all participants of the one or more participants are within the predetermined distance from the physical location.

F13. The framework according to the previous frameworks F9 to F12, wherein the particular location-based event trigger is triggered manually.

F14. The framework of according to the previous framework, wherein the particular location-based event trigger is triggered based on information provided by the backend platform.

F15. The framework of according to the previous frameworks F9 to F12, wherein the particular location-based event trigger is triggered automatically.

F16. The framework of any one of the preceding frameworks, wherein at least one physical location comprises an outdoor location.

F17. The framework of any one of the preceding frameworks, wherein at least one physical location comprises an indoor location.

F18. The framework of any one of the preceding frameworks, wherein at least one physical location comprises a vehicle.

F19. The framework of any one of the preceding frameworks, wherein at least one physical location comprises a path or road between two other physical locations.

F20. The framework of any one of the preceding frameworks, wherein the aspects of the at least one storyline are delivered to the at least some of the participants in real-time.

F21. The framework of any one of the preceding frameworks, wherein the aspects of the at least one storyline are delivered simultaneously to multiple devices associated with the one or more participants.

F22. The framework of according to the previous frameworks, wherein the aspects of the at least one storyline are delivered synchronously to the multiple devices.

F23. The framework of any one of the preceding frameworks, wherein the one or more elements are presented sequentially.

F24. The framework of any one of the preceding frameworks, wherein the one or more participants has multiple devices.

F25. The framework of any one of the preceding frameworks, wherein the one or more participants have at least three devices.

F26. The framework of any one of the preceding frameworks, wherein the one or more participants comprises at least three participants, and wherein the one or more participants have at least three devices.

F27. The framework of any one of the preceding frameworks, wherein the backend platform delivers at least some of the at least one of the storylines to devices of the one or more participants prior to any of the event triggers.

F28. The framework of according to the previous framework, wherein the backend platform delivers all of the at least one of the storylines to devices of the one or more participants prior to any of the event triggers.

F29. The framework of any one of the preceding frameworks, wherein the backend platform delivers at least some of the at least one of the storylines to devices of the one or more participants in response to at least one of the event triggers.

F30. The framework of any one of the preceding frameworks, wherein the backend platform delivers files comprising storylines to devices of the one or more participants.

F31. The framework of any one of the preceding frameworks, wherein the aspects of at least one of the storylines are pre-loaded into at least one device.

F32. The framework of any one of the preceding frameworks, wherein at least some of the one or more event triggers are evaluated on a device.

F33. The framework of according to the previous framework, wherein all of the event triggers are evaluated on a device.

F34. The framework of any one of the preceding frameworks, wherein at least some of the one or more event triggers are evaluated on the backend platform.

F35. The framework of any one of the preceding frameworks, wherein all of the one or more event triggers are evaluated on the backend platform.

F36. The framework of any one of the preceding frameworks, wherein at least one of the one or more event triggers is triggered manually.

F37. The framework of any one of the preceding frameworks, wherein at least one of the one or more event triggers is triggered automatically.

F38. The framework of any one of the preceding frameworks, wherein each the at least one device comprises a device selected from: (i) a smartphone, (ii) a tablet computer, (iii) a portable audio device, (iv) a portable video device, (v) augmented reality (AR) glasses, (vi) an AR headset; and (vii) a virtual reality headset.

F39. The framework of any one of the preceding frameworks, wherein the one or more participants has multiple devices, and at least two of the devices are different types.

F40. The framework of according to the previous framework F38, wherein the one or more participants has multiple homogenous devices.

F41. The framework of any one of the preceding frameworks, wherein less than the entire story is presented to at least some of the one or more participants.

F42. The framework of any one of the preceding frameworks, wherein at least one entire storyline is presented to at least some of the one or more participants.

F43. The framework of any one of the preceding frameworks, wherein at least one storyline is presented differently to different participants in the one or more participants.

F44. The framework of according to the previous frameworks, wherein at least one storyline is presented in a different order to different participants in the one or more participants.

F45. The framework of any one of the preceding frameworks, wherein at least one storyline is presented in the same manner to all participants in the one or more participants.

F46. The framework of any one of the preceding frameworks, wherein the backend platform maintains information about presentation of the aspects of the story to the one or more participants.

F47. The framework of according to the previous frameworks, wherein the information maintained by the backend platform includes information about which aspects of the story have been delivered to which participants of the one or more participants.

F48. The framework of according to the previous frameworks F46 or F47, wherein the information maintained by the backend platform is used to control delivery of the aspects of the at least one of the storylines.

F49. The framework of any one of the preceding frameworks, wherein the backend platform comprises a master control system.

F50. The framework of any one of the preceding frameworks, wherein the backend platform manages delivery of the aspects of the story to the participants in the one or more participants simultaneously.

F51. The framework of any one of the preceding frameworks, wherein said aspects of said story comprise content associated with said story.

F52. The framework of any one of the preceding frameworks, wherein the one or more participants consist of exactly one participant.

F53. The framework of any one of the preceding frameworks, wherein the one or more participants comprise more than one participant.

F54. The framework of any one of the preceding frameworks, wherein the one or more participants comprise a group.

Below is a list of method (or process) embodiments. Those will be indicated with a letter "M". Whenever such embodiments are referred to, this will be done by referring to "M" embodiments.

M55. A method, in a framework for presenting aspects of a story to one or more participants, said one or more participants having at least one device, the story having one or more storylines, each storyline comprising one or more segments, each segment comprising one or more elements, each of said one or more elements comprising (i) a physical location; (ii) actions; and (iii) at least one event trigger, said framework comprising a backend platform storing information about said story and interacting with said at least one device of said one or more participants, the method comprising:

(A) evaluating at least one event trigger; and (B) in response to said evaluating, delivering aspects of at least one of said storylines to at least some of said one or more participants.

M56. The method as in method M55, wherein at least one of said elements includes or is associated with one or more scripted activities, and wherein said delivering comprises:

(a) delivering one or more scripted activities.

M57. The method as in method M56, wherein the one or more scripted activities comprise one or more of: (i) audio activities; and (ii) video activities.

M58. The method as in methods M56 or M57, wherein the one or more scripted activities comprise live acting theater.

M59. The method of any one of methods M55-M58, wherein at least one of said elements includes or is associated with augmented reality (AR) content, and wherein said delivering comprises:

(a) delivering at least some of said augmented reality (AR) content.

M60. The method as in method M59 wherein the AR content comprises one or more of: (i) animation content; (ii) video content; (iii) audio content; (iv) graphics content; and (v) text content.

M61. The method of any one of methods M55-M60, wherein at least some of said event triggers are location-based.

M62. The method as in method M61, wherein a particular location-based event trigger is associated with a particular physical location, and wherein said particular location-based event trigger is triggered based on a number of participants in said one or more participants being within a predetermined distance from said physical location.

M63. The method as in method M62, wherein said particular location-based event trigger is triggered based on when at least one participant in said one or more participants is within a predetermined distance from said physical location.

M64. The method as in method M63, wherein said particular location-based event trigger is triggered based on whether at least a certain percentage of said one or more participants are within said predetermined distance from said physical location.

M65. The method of any one of methods M59-M64, wherein said particular location-based event trigger is triggered when fewer than all participants of said one or more participants are within said predetermined distance from said physical location.

M66. The method of any one of methods M59-M65, wherein said particular location-based event trigger is triggered based on information provided by said backend platform.

M67. The method of any one of methods M59-M66, further comprising: manually triggering said particular location-based event trigger.

M68. The method of any one of methods M59-M66, further comprising: automatically triggering said particular location-based event trigger.

M69. The method of any one of methods M55-M68, wherein at least one physical location comprises an outdoor location.

M70. The method of any one of methods M55-M69, wherein at least one physical location comprises an indoor location.

M71. The method of any one of methods M55-M70, wherein at least one physical location comprises a vehicle.

M72. The method of any one of methods M55-M71, wherein at least one physical location comprises a path or road between two other physical locations.

M73. The method of any one of methods M55-M72, wherein said aspects of said at least one storyline are delivered to said at least some of said participants in real-time.

M74. The method of any one of methods M55-M73, wherein said aspects of said at least one storyline are delivered simultaneously to multiple devices associated with said one or more participants.

M75. The method as in method M74, wherein said aspects of said at least one storyline are delivered synchronously to said multiple devices.

M76. The method of any one of methods M55-M75, wherein one or more elements are presented sequentially.

M77. The method of any one of methods M55-M76, wherein said one or more participants have multiple devices.

M78. The method of any one of methods M55-M77, wherein said one or more participants has at least three devices.

M79. The method of any one of methods M55-M78, wherein said one or more participants comprises at least three participants, and wherein said one or more participants has at least three devices.

M80. The method of any one of methods M55-M79, wherein said backend platform delivers at least some of said at least one of said storylines to devices of said one or more participants prior to any of said event triggers.

M81. The method as in method M80, wherein said backend platform delivers all of said at least one of said storylines to devices of said one or more participants prior to any of said event triggers.

M82. The method of any one of methods M55-M81, wherein said backend platform delivers at least some of said at least one of said storylines to devices of said one or more participants in response to at least one of said event triggers.

M83. The method of any one of methods M55-M82, wherein said backend platform delivers files comprising storylines to devices of said one or more participants.

M84. The method of any one of methods M55-M83, wherein said aspects of at least one of said storylines are pre-loaded into at least one device.

M85. The method of any one of methods M55-M84, wherein at least some of said one or more event triggers are evaluated on a device.

M86. The method as in method M85, wherein all of said event triggers are evaluated on a device.

M87. The method of any one of methods M55-M86, wherein at least some of said one or more event triggers are evaluated on said backend platform.

M88. The method of any one of methods M55-M87, wherein all of said one or more event triggers are evaluated on said backend platform.

M89. The method of any one of methods M55-M88, wherein at least one of said one or more event triggers is triggered manually.

M90. The method of any one of methods M55-M89, wherein at least one of said one or more event triggers is triggered automatically.

M91. The method of any one of methods M55-M90, wherein each said at least one device comprises a device selected from: (i) a smartphone, (ii) a tablet computer, (iii) a portable audio device, (iv) a portable video device, (v) augmented reality (AR) glasses, (vi) an AR headset; and (vii) a virtual reality headset.

M92. The method of any one of methods M55-M91, wherein said one or more participants has multiple devices, and at least two of said devices are different types.

M93. The method as in method M92, wherein said one or more participants has multiple homogenous devices.

M94. The method of any one of methods M55-M93, wherein less than said entire story is presented to at least some of said one or more participants.

M95. The method of any one of methods M55-M94, wherein at least one entire storyline is presented to at least some of said one or more participants.

M96. The method of any one of methods M55-M95, wherein at least one storyline is presented differently to different participants in said one or more participants.

M97. The method as in method M96, wherein at least one storyline is presented in a different order to at least two different participants in said one or more participants.

M98. The method of any one of methods M55-M97, wherein at least one storyline is presented in the same manner to all participants in said one or more participants.

M99. The method of any one of methods M55-M98, wherein said backend platform maintains information about presentation of said aspects of said story to said one or more participants.

M100. The method as in method M99, wherein said information maintained by said backend platform includes information about which aspects of said story have been delivered to which participants of said one or more participants.

M101. The method as in methods M99 or M100, wherein said information maintained by said backend platform is used to control delivery of said aspects of said at least one of said storylines.

M102. The method of any one of methods M55-M101, wherein said backend platform comprises a master control system.

M103. The method of any one of methods M55-M102, wherein said backend platform manages delivery of said aspects of said story to said participants in said one or more participants simultaneously.

M104. The method of any one of methods M55-M103, wherein at least one of said elements includes or is associated with at least one real-world object.

M105. The method of any one of methods M55-M104, further comprising: repeating acts (A) and (B) for multiple event triggers.

M106. The method as in method M105, wherein said repeating occurs at multiple physical locations.

M107. The method of any one of methods M55-M106, wherein said aspects of said story comprise content associated with said story.

M108. The method of any one of methods M55-M107, wherein the one or more participants consists of exactly one participant.

M109. The method of any one of methods M55-M109, wherein the one or more participants comprise more than one participant.

M110. The method of any one of methods M55-M109, wherein the one or more participants comprise a group.

M111. The method any one of methods M55-M110 performed on the framework of any one of frameworks F1-F54.

Below is a list of computer-readable medium embodiments. Those will be indicated with a letter "C". Whenever such embodiments are referred to, this will be done by referring to "C" embodiments.

C112. A computer-readable medium with one or more computer programs stored therein that, when executed by one or more processors of a device, cause the one or more processors to perform, the operations of: the method of any one of methods M55-M111.

C113. The computer-readable medium of C112, wherein the method is performed on the framework of any one of frameworks F1-F54.

C114. The computer-readable medium of C112 or C113, wherein the medium is non-transitory.

The above features along with additional details of the invention, are described further in the examples herein, which are intended to further illustrate the invention but are not intended to limit its scope in any way.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

FIGS. 1A, 1B, 2A, and 2B are schematics showing aspects a storyline with storyline segments according to exemplary embodiments hereof;

DETAILED DESCRIPTION OF THE PRESENTLY PREFERRED EXEMPLARY EMBODIMENTS

Figure 1A:
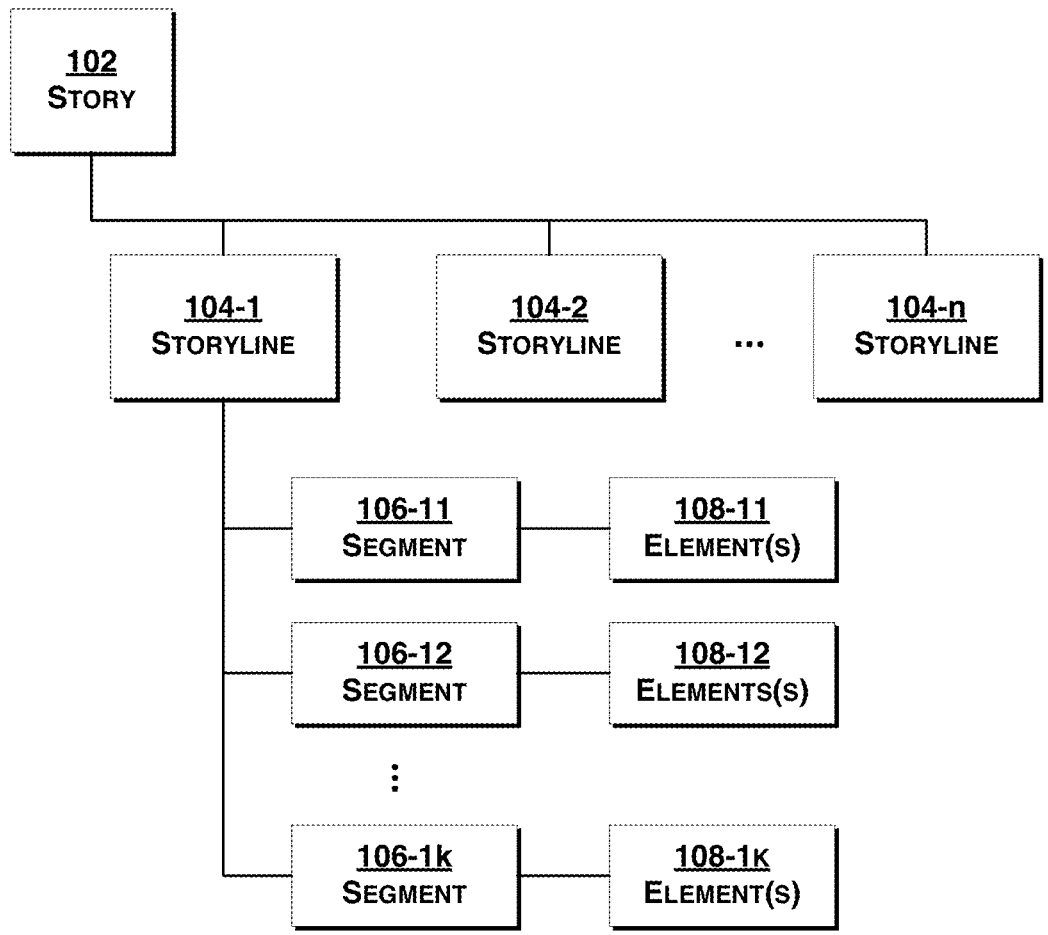

In the following, exemplary embodiments of the invention will be described, referring to the figures. These examples are provided to provide further understanding of the invention, without limiting its scope.

In the following description, a series of features and/or acts are described. The skilled person will appreciate that unless required by the context, the order of features and steps is not critical for the resulting configuration and its effect. Further, it will be apparent to the skilled person that irrespective of the order of features and acts, the presence or absence of time delay between acts, can be present between some or all of the described acts.

Reference numerals have just been referred to for reasons of quicker understanding and are not intended to limit the scope of the present invention in any manner.

Glossary and Abbreviations

As used herein, unless used otherwise, the following terms or abbreviations have the following meanings:

"AR" means augmented reality.

"VR" means virtual reality.

The term "mechanism," as used herein, refers to any device(s), process(es), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

Description

The following detailed description is not intended to limit the current invention. Alternate embodiments and variations of the subject matter described herein will be apparent to those skilled in the art.

Exemplary methods and systems according to exemplary embodiments hereof are described with reference to the drawings.

In general, a system according to exemplary embodiments hereof may provide for the creation and delivery of one or more stories.

A story may be or represent any story or narrative, including fantasy, reality, history, and any combinations thereof. The scope of embodiments hereof is not limited in any way by the type or content of any story.

With reference to FIG. 1A, a story 102 is made up of one or more storylines 104-1, 104-2, . . . 104-n (collectively and individually storyline(s) 104). Each storyline 104 may include a specific portion of its respective overall story 102, such that when the storyline(s) 104 are experienced (in one or more orders), an overall story 102 may be effectively experienced. A story 102 may have a single storyline.

Each storyline 104 may be made up of and/or generally include one or more storyline segments 106-1, 106-2, . . . 106-k (collectively and individually storyline segment(s) 106). A storyline 104 may have a single storyline segment. Different storylines may have different numbers of storyline segments.

Each storyline segment 106 may include a specific portion of its respective overall storyline 104 such that when the storyline segments 106 are delivered/experienced in one or more orders, an overall storyline 104 may be effectively delivered and experienced.

For example, a first storyline segment 106-11 may correspond to the delivery of a first portion of the complete storyline 104-1, and a second storyline segment 106-12 may correspond to the delivery of a second portion of the complete storyline 104-1. Each segment 106-1j of the storyline 104-1 may represent a scene, a chapter or any other type of segment or portion of the storyline 104-1. The storyline segments 106 may flow continuously and seamlessly from one to the next, or there may be breaks in-between some of the segments 106 (e.g., when it may be necessary for the participants to travel to a new physical location for the next segment 106). In any event, as the storyline segments 106 are delivered to the participants, the storyline 104-1 may unfold and progress.

A complete storyline 104 may be created by constructing the storyline segments 106 and then delivering them to the audience to experience in combination.

There is no requirement that an entire story be delivered or presented or offered to or experienced by any or all people in a group, nor is there any requirement that an entire storyline be delivered or presented or offered to or experienced by any or all people in a group. When used herein, the terms "delivered" or "presented" or "offered," with reference to a story or storyline or storyline segment, mean "delivered" or "presented" or "offered," at least in part.

A storyline 104 may be created and delivered, offered, or otherwise presented to one or more audience members (also referred to as the "users", "viewers", "participants", etc.) via embodiments hereof. A collection of one or more users or viewers or participants is sometimes referred to herein as a "group" of users. Thus, a group may have only a single member or multiple members.

Each storyline 104 may be delivered or presented (in full or in part) to different groups of people (or even a single individual) at different settings and physical locations to provide a dramatic, entertaining and informative experience. For example, a storyline 104 may be delivered to a tour group that may be visiting several different historical locations within a particular city or region. In another example, a storyline 104 may be delivered to a group of patrons that may be visiting a particular art exhibit at a particular museum. It should thus be appreciated that storyline 104 may be delivered to any group of one or more people at any type of venue.

A storyline 104 and its storyline segments 106 may be delivered or presented or offered over any time period (e.g., over a series of hours, days, weeks or other periods of time), and embodiments hereof are not limited by the time required or taken to present or offer any storyline or any story.

Figure 2A:
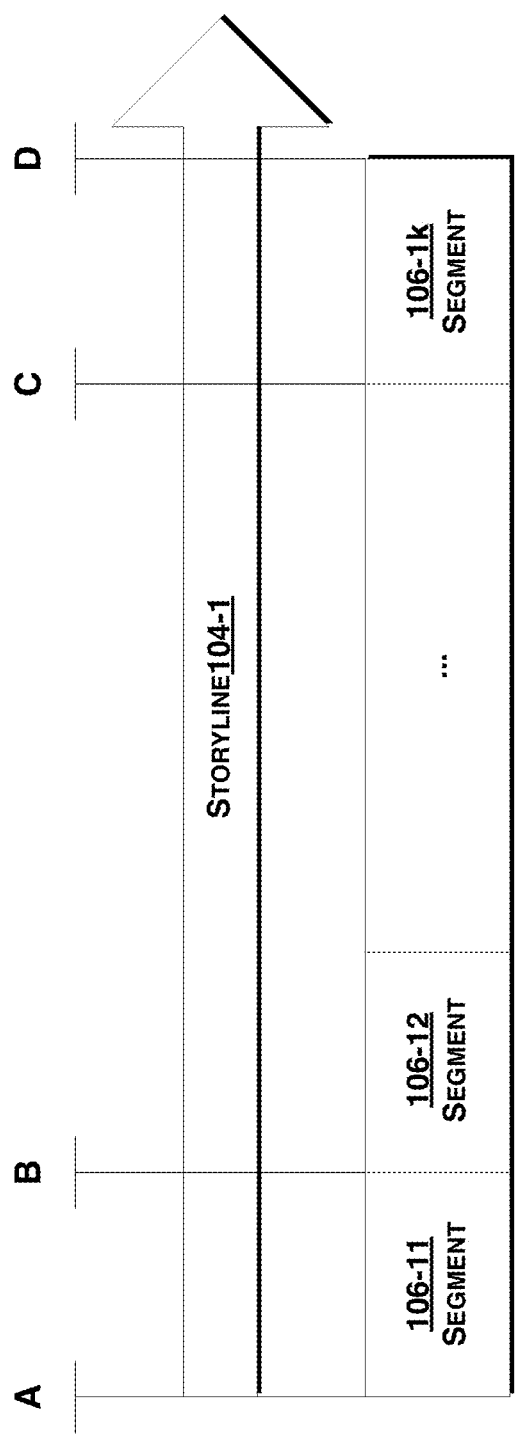
Figure 2B:
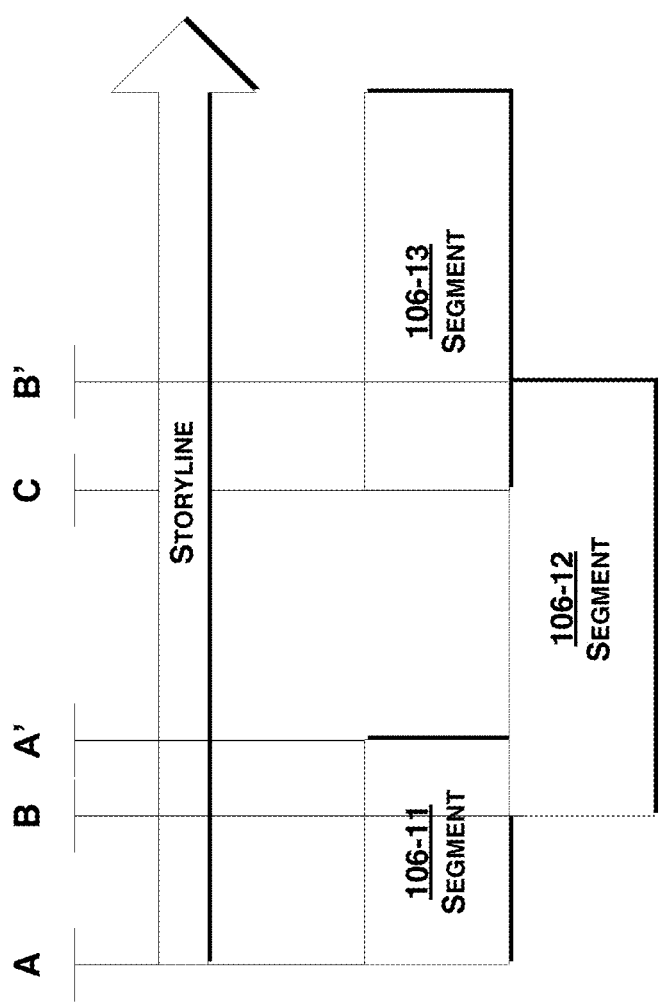

FIGS. 2A and 2B are schematics showing aspects of a storyline with storyline segments according to exemplary embodiments hereof.

FIG. 2A shows an exemplary order of presenting the k segments) 106-11 . . . 106-1k of the storyline 104-1 of FIG. 1A.

In the example shown in FIG. 2A, storyline 104-1 may generally include a beginning A and an ending D. Accordingly, segment 106-11 may begin at A as it may be the first storyline segment 106 that may be presented. Storyline segment 106-11 may then end at B, upon which time storyline segment 106-12 may begin. Storyline segment 106-12 may continue and then end at C at which point storyline segment 106-13 may begin, and so on. Storyline may then continue until the end D of overall storyline 104-1. Note that beginning A and ending D may represent the beginning and ending of storyline 104-1 such that as the storyline segments 106 are experienced from A to D, the overall storyline 104-1 may be experienced. However, note that if storyline 104-1 is itself a storyline segment 104 in a larger storyline 104 (or a story 102), beginning A and ending D may not represent the beginning and ending of the larger storyline or story 102.

With reference now to FIG. 2B, the storyline 102 may also include storyline segments 106 that that may overlap, at least in part, with portions of other segments 106. For instance, storyline segment 106-A may start at A and end at A'. Whereas, storyline segment 106-B may start at B, that may occur at a time that may be prior to the ending of storyline segment 106-A at A'. In addition, storyline segment 104-5 may end at B', which may occur at a time that may be after the beginning of storyline segment 104-C at C. It can be appreciated that this example is meant for demonstration and that any portions of any storyline segments 104 may or may not overlap with any portions of any other storyline segments 104.

For purposes of description, this specification will generally describe methods and systems with respect to a single story 102 and storyline 104. However, it should be clear that multiple stories 102 and storylines 104, created, delivered, and/or experienced individually or in combination, are also within the scope of embodiments hereof.

Distinct versions of the same general story 102 and/or storyline 104 may be available, with the different versions of a story 102 including different storylines and/or different numbers of storylines 104. Different storylines 104 may include different storyline segments 106 and/or numbers of storyline segments 106. For example, a more expensive tour package experience may include an additional physical location (and additional storyline segment 106 that may be associated with the additional physical location) that the group may visit and experience compared to a lesser expensive tour package that may not include the additional physical location and associated storyline segment 106. However, the overall storyline 104 (e.g., general historical information/story) experienced by both groups may be generally the same or very similar.

The storyline segments 106 may generally be delivered to users in an order that may be based on a variety of criteria, including but not limited to:
 (i) predetermined criteria (e.g., sequentially),
 (ii) dynamic and/or real-time criteria (e.g., using triggers),
 (iii) a combination of predetermined and dynamic criteria, and
 (iv) other types of criteria.

With reference now to FIGS. 1A-1B, each storyline segment 106 may include one or more storyline components or elements 108 that may include but are not limited to:
1. One or more physical locations 110-1, 110-2, . . . 110-p (collectively and individually location(s) 110), each with one or more real-world objects 112-1, 112-2, . . . 112-m (collectively and individually object(s) 112) and associated location data 114-1, 114-2, 114-3 . . . 114-n (collectively and individually location(s) 114). The location data 114 may comprise information that allows a device to determine when it is at or near the corresponding physical location.
2. Scripted activities 116 that may include one or more of the following:
 audio 118-1, 118-2, . . . 118-i (collectively and individually audio 118),
 video 120-1, 120-2, . . . 120-j (collectively and individually video 120),
 live theater 122-1, 122-2, . . . 122-k (collectively and individually live theater 122) and
 other types of scripted elements 124.
3. Augmented reality (AR) elements 126 that may include one or more of the following:
 animation 128-1, 128-2, . . . 128-r (collectively and individually animation(s) 128),
 video 130-1, 130-2, . . . 130-s (collectively and individually video(s) 130),
 audio 132-1, 132-2, . . . 132-t (collectively and individually audio 132),
 graphics 134-1, 134-2, . . . 134-u (collectively and individually graphics 134),
 text 136-1, 136-2, . . . 136-v (collectively and individually text 136) and other types of AR elements 138
4. One or more event triggers 140

The storyline segment components or elements 108 listed above do not limit system or storyline 104 in any way, and those of ordinary skill in the art will realize and appreciate, upon reading this description, that different and/or other types of storyline components or elements may also be included in storyline 104. For example, other types of elements such as virtual reality, haptic elements, or other types of multimedia elements may also be used.

Figure 3:
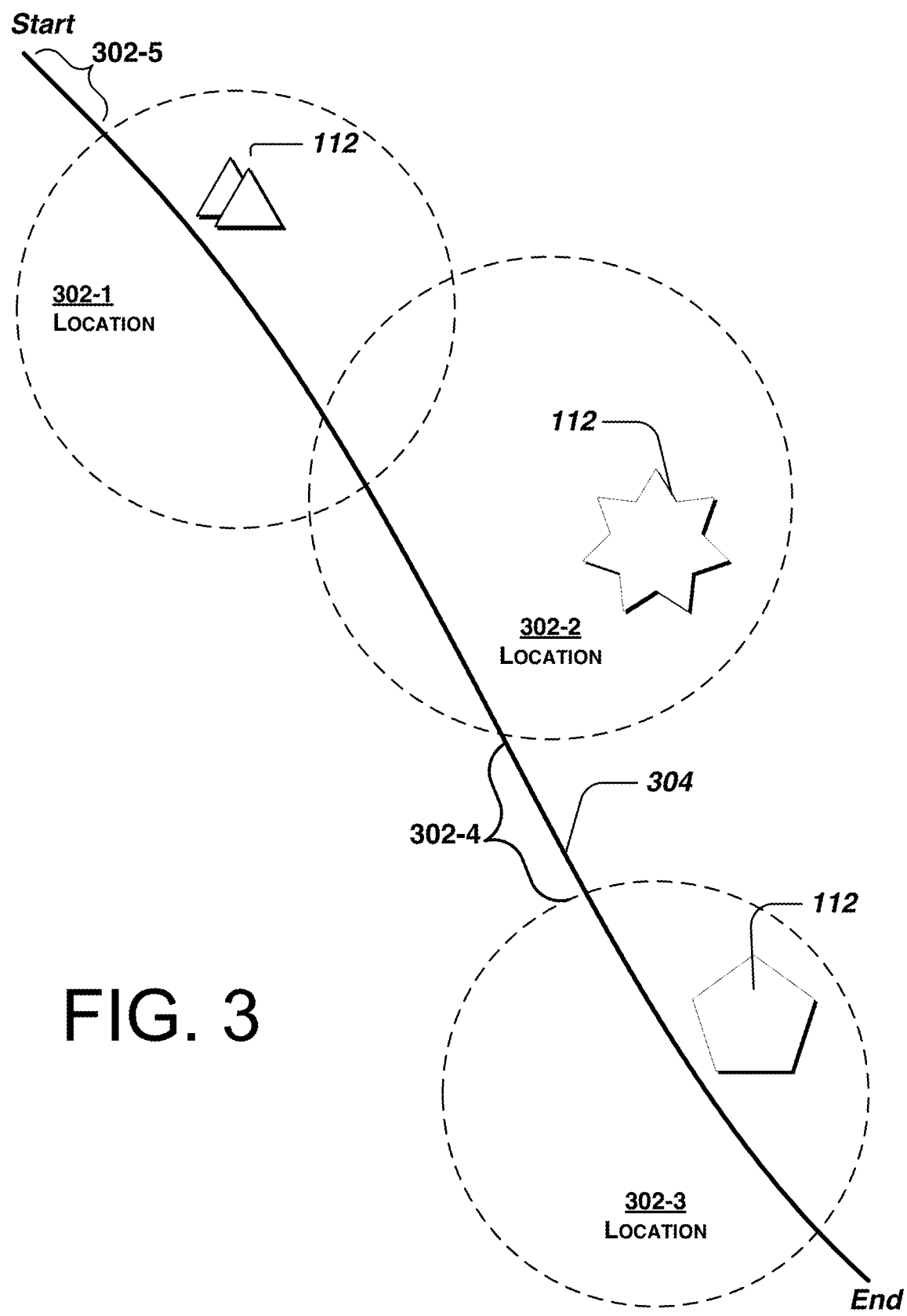
FIG. 3 is a schematic representation of physical locations associated with an exemplary story or storyline according to exemplary embodiments hereof.

FIG. 3 is a schematic representation of physical locations 110 associated with an exemplary story 102 or storyline 104.

In the example shown in FIG. 3, three locations (302-1, 302-2, 303-3) are represented by circles generally surrounding those locations. While circles are used to aid this description, it should be appreciated that a location may have any shape and/or area. An exemplary path 304 is shown traversing the three locations 302-1, 302-2, 303-3. Note that a path segment may also be considered to be a location. Thus, e.g., the path segment between locations 302-2 and 302-3 may also be considered a location (302-4). Similarly, the path segment from a start location to the first location 302-1 may also be considered a location (302-5).

The path 304 may comprise multiple path segments that may be traveled in various different ways (e.g., by bus, car, train, plane, on foot, bicycle, etc.) There is no requirement that all users use the same path or mode of transportation or that the path be homogenous along its length. There may be multiple paths to and between locations.

The physical locations 110 may include indoor and outdoor locations (e.g., museums, arenas, historical buildings or homes, stadiums, historical landmarks, parks, recreation areas, wilderness areas, cities, country sides, attractions, roads, vehicles, busses, trains, train stations, airports, airplanes, or any other type of indoor or outdoor area or any other type of structure or combinations of structures). The physical locations 110 may also include any combination of indoor and outdoor environments.

The real world objects 112 may include any type of object, structure or any type of physical matter. For example, a real world object may include a particular building, a courtyard, a painting, a statue, a hillside, a city street, a bridge, a river, a lake, a field, a bicycle, a golden vase, or any other type of physical object or matter.

In general, the physical locations 110 and their respective real world objects 112 may act as the settings, surroundings, backgrounds, environments, or backdrops to the storyline segments 106. Accordingly, it may be preferable that each physical location 110 and its respective real world objects be chosen to generally pertain, relate and/or be relevant to the subject matter of the storyline segment 106 in which the physical location 110 may be included. Note, however, this may not be required, and the physical locations used may bear no relation to any actual story associated with the storyline). For example, a particular storyline segment 106 relating to a Biblical story may include a plotline that may take place in a historical part of an ancient Biblical city, and the physical locations 110 included in the segment 106 may be specific locations within the Biblical city that may be integral to the storyline segment 106 and overall storyline 104 (e.g., historical landmarks).

For each storyline segment 106, the viewers of the segment 106 may travel or otherwise be located at a physical location 110 at the correct moment in time such that they may experience the respective storyline segment 106 designed to be experienced at the particular location 110. As will be described in later sections, this experience may involve AR content delivered to augment the particular physical location 110 and its real world objects, scripted audio delivered at the physical location 110, live theater performed at the physical location 110, as well as other storytelling elements, all orchestrated to convey or generally deliver a multimedia storyline segment 106 to the viewer in real time.

As each storyline 104 may include different and distinct physical locations 110, users or participants may be required to travel between the locations 110 as one segment 106 may be generally ending and another segment 106 may be generally beginning. For example, if the storyline segment 106-1 may include a distinct first physical location 110-1 (e.g., a particular street corner within a particular city), and the storyline segment 106-2 may include a different and distinct second physical location 110-2 (e.g., inside a building down the street from the first location 110-1), it may be necessary for the viewer of storyline 104 to travel from the first physical location 110-1 to the second physical location 110-2 when the storyline 104 at the appropriate time. In this way, the participant may be located in the correct setting for each storyline segment 106.

Travel time to or between different physical locations 110 may also be included in the storyline segments 106. For example, a system according to exemplary embodiments hereof may deliver the storyline 104 to a guided tour group that may be traveling by bus. In this example, the tour group may board the bus at a central meeting point in order to travel to the first location 110-1. The first storyline segment 106-1 may commence upon the bus leaving the meeting point. For example, the first storyline segment 106-1 may begin by providing prerecorded audio 118-1 for the participants to listen to (e.g., using a media device preferably with headphones, or over a speaker, etc.) as they ride the bus to the first physical location 110-1. The audio 118-1 may provide background information for the storyline 104 and may set the stage for the drama that is about to unfold as the participants reach the first physical location 110-1. As noted above, a vehicle may be considered a physical location and a path or road to and/or from physical locations may also be considered a physical location (e.g., path segments 302-4, 302-5 in FIG. 3).

In another example, a live theater element 122-1 may be included on a bus in the form of one or more actors that may be characters in the corresponding storyline segment 106-1. The actors may enact a scene on the bus that may begin the storyline segment 106-1, may interact directly with the participants to provide them information about the storyline 104, or may perform any other type of live theater.

A vehicle such as a bus may also be equipped with one or more video displays that may play video 120-1 as a part of the corresponding storyline segment 106-1. In addition, participants may view video 120-1 on portable display devices such as on their own personal smartphones or tablet computers, on display devices that may be provided by the organizers of the storyline 104 or corresponding story 102, or on any combination thereof.

As depicted, e.g., in FIG. 3, some physical locations may overlap, while some physical locations may be entirely distinct and independent from other physical locations. It should also be noted that a particular storyline segment 106 may include one or more physical locations 110 with associated real world objects. For example, a storyline segment 106 may include several locations 110 along a historical street within a city that the participants may travel along. In this way, the participants may travel seamlessly from one location 110 (sub-location) to another location 110 (sub-location) within segment 106 and receive the multimedia content delivered along the way. The sub-locations 110 may also be distinct and not located together such that the participants may need to travel between the sub-locations (e.g., by bus, train, car or by other methods of travel).

Event Triggers

Storyline elements 108 may be delivered to participants based on storyline event triggers 140 that may occur during a storyline experience. Event triggers 140 may be location based and may use the location data 114 associated with a storyline, along with location information about users.

Event triggers 140 may include but are not limited to: location based triggers, time based triggers, triggers based on other storyline elements (e.g., based on when another storyline element may begin, may end, etc.), triggers based on a user's action (e.g., based upon a user interacting with an AR object, etc.), manually activated triggers (e.g., activated by an operator of the system), and other types of triggers. As should be appreciated, this list of event triggers is exemplary, and is meant for demonstration purposes, and different and/or other triggers may be used.

For example, AR content may be superimposed onto the view of a particular real world object as viewed on a particular participant's device when that participant may arrive at a specific location. The participant may arrive at the right spot and the AR content may be delivered to his/her device and viewed.

An event trigger 140 may also be based on a number of percentage of participants or users. For example, a location-based trigger may require at least some predetermined number of users in a group (e.g., 70% or 80% or 90%) to be present at a particular location before an associated storyline event is triggered. The predetermined number may be as low as 1. The predetermined percentage of the group size may be any percentage, including up to 100%. A default 210 predetermined percentage may be used. Not all events need number or percentage-based triggers, and when multiple events have number or percentage-based triggers, the numbers or percentages need not be the same. For example, a particular event may require at least 95% of the users to be at a particular location, whereas another event may only require at least 50% of the users.

Devices and Backend System

Figure 4A:
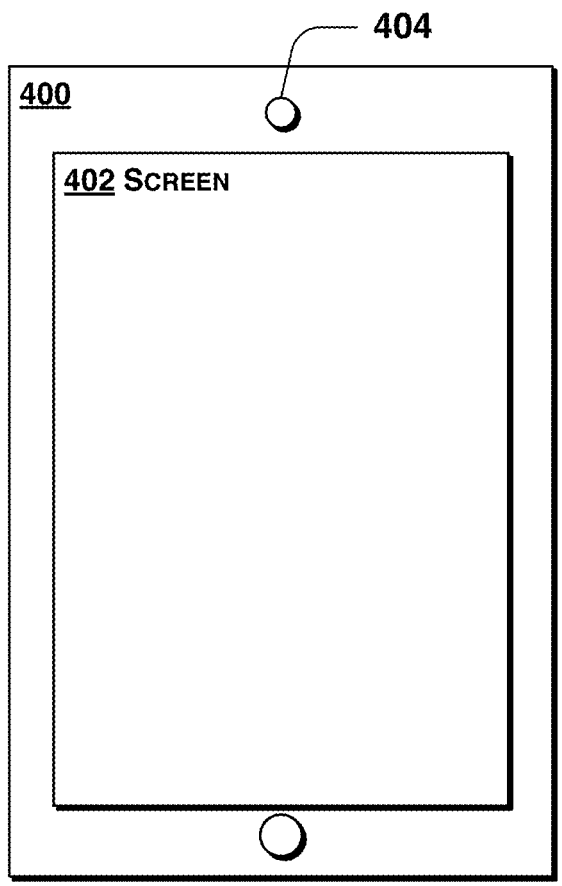
FIGS. 4A-4C depict aspects of a device according to exemplary embodiments hereof.
Figure 4B:
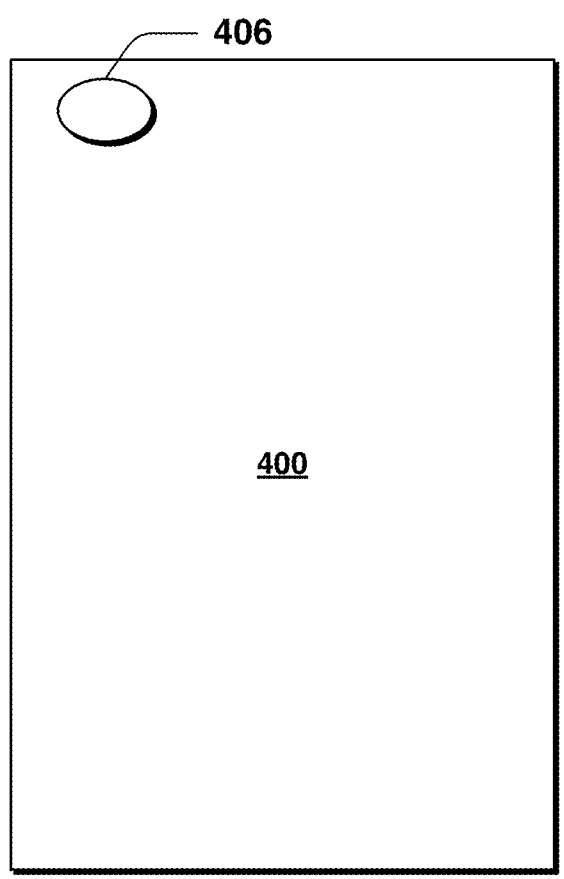
Figure 4C:
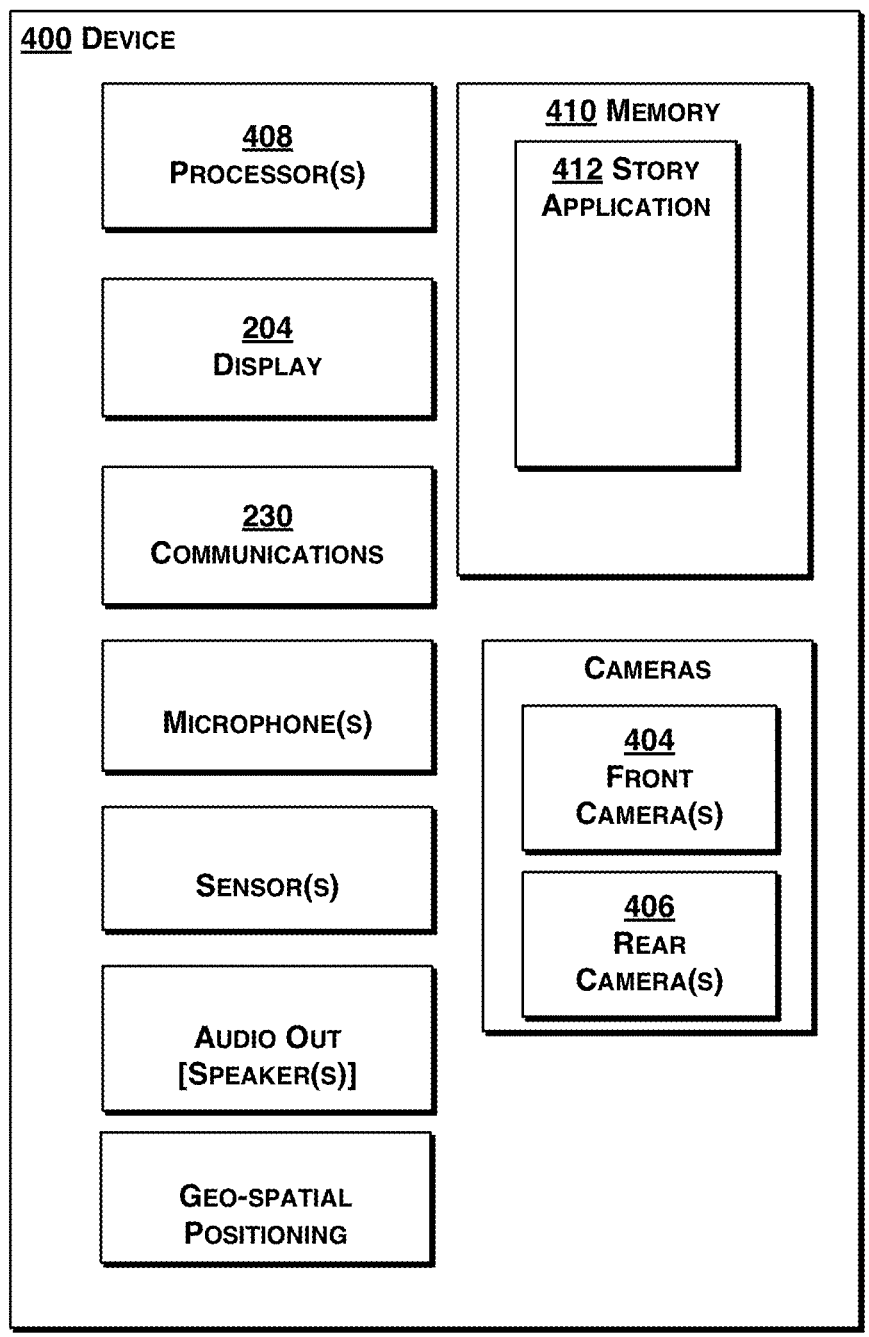

Some of the storyline elements 108 may require the use of a device 400 such as shown in FIGS. 4A-4C (e.g., to listen to audio, view video and/or AR content, and generally to render content and information associated with the storyline elements). FIGS. 4A-4B depicts generalized front and back views of a device 400, and FIG. 4C depicts some internal/functional components of an exemplary device 400.

The device 400 may be a smartphone, a tablet computer, a portable audio device, a portable video device, AR glasses, a VR or AR headset, or any other type of device or combinations of devices that may be used to receive and experience the storyline segment 106 elements. The device 400 preferably includes at least one display 402, and at least one camera. In the case of AR glasses, the display may be or use the lens or glass in the glasses.

As should be appreciated, the device 400 is essentially a computing device (as described in greater detail below). The device 400 may thus include various other components necessary for the device 400 to perform its functionalities as describe herein (e.g., a processor 408, memory 410, and other components).

The functionality described herein may be implemented, at least in part, by one or more mechanisms, including software applications, generally referred to as story application 412. The story application 412 is shown in the memory 410 of the device 400, although it may use other types of mechanisms to be installed and running on the device.

For the receiving and general viewing of some of the elements (such as the AR elements) the device 400 may require an AR application (or app), special software or other types of mechanisms to be installed and running on the device 400 in order to experience the storyline element(s) 108. In other cases, Internet connectivity may be required (e.g. to receive streaming audio and/or video from a backend or cloud platform described below). The connectivity may rely on the telephony connectivity, and in other cases the connectivity may be provided by other sources (e.g., service provider over Wi-Fi, etc.). In this way, the devices 400 may communicate with platforms on the Internet (e.g., a backend(s) 502) via the Internet and/or with each other device 400 via the Internet or telephony.

The device 400 preferably also includes a GPS mechanism or the like so that it may precisely determine the device's location.

Figure 5:
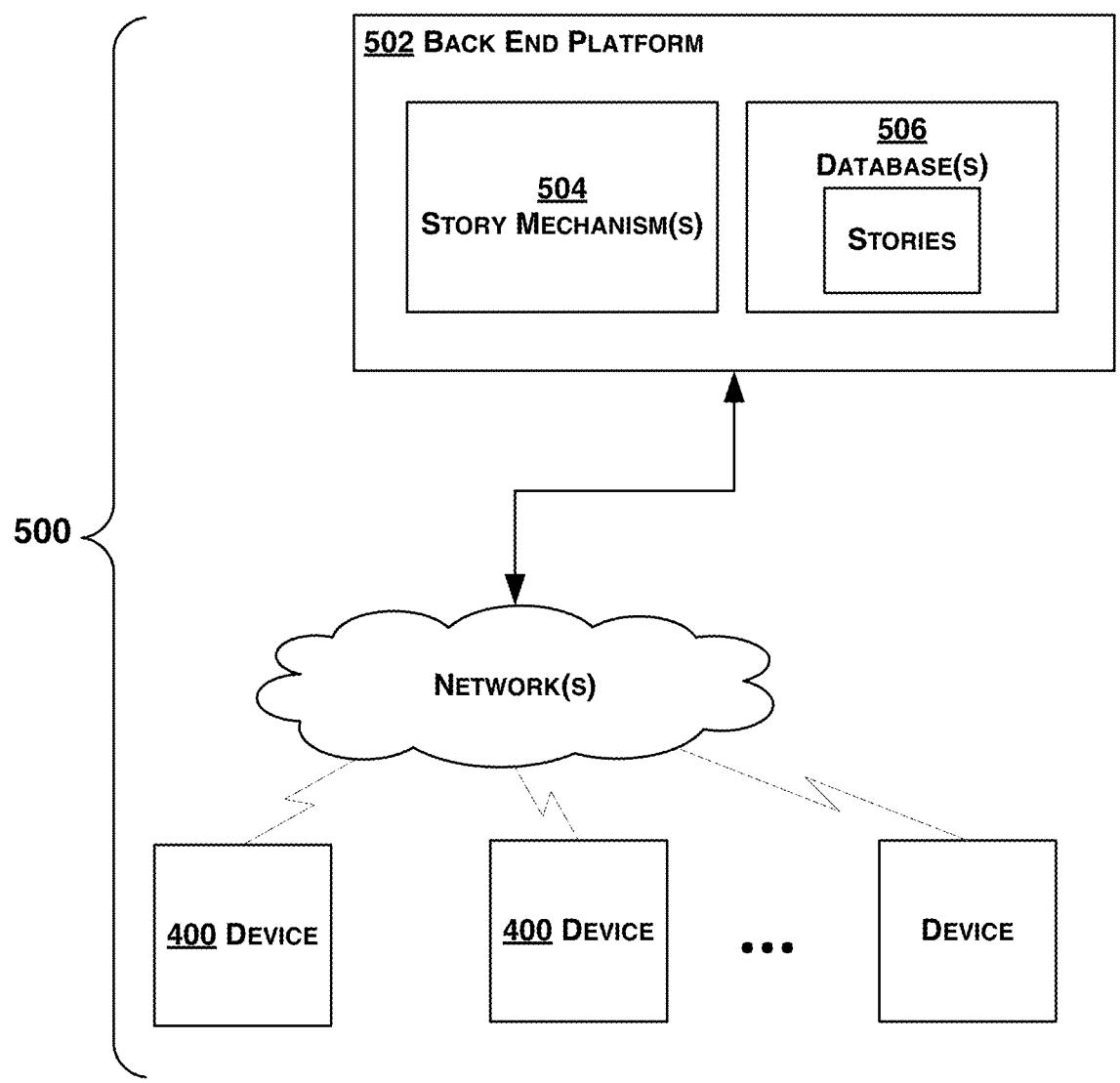
FIG. 5 depicts aspects of a story system, according to exemplary embodiments hereof.

With reference now to FIG. 5, a system 500 according to exemplary embodiments hereof may include a backend platform 502 (also referred to as a cloud platform) that may include one or more servers, one or more processors, memory, software, firmware, operating systems, a location determining mechanism, and other components and elements that may be necessary for backend platform 502 perform its functionalities as described herein. In some exemplary embodiments hereof, some or the entire backend platform 502 may sometimes be referred to as a master control system.

Multiple users may each possess at least one device 400, although some users may share a device 400. For example, users may not have purchased the tour package that may include the use of a device 400, etc. As noted, the devices 400 may include smartphones, tablet computers, AR viewing devices, portable audio devices, and any other type of media device 400 or combination of media devices 400. The devices need not be homogeneous, and different users may possess different types of devices 400.

The backend platform 502 is essentially one or more computer systems (as described below), and may include a story mechanism 504 comprising one or more software programs to implement aspects of the story system as described herein.

The backend platform 502 may include all content, including the media content for all stories for which it is responsible (e.g., storyline elements 108 described above). The content may be stored in at least one database 506 that may be included within or accessible by the backend platform 502. In addition, the backend platform 502 may include (e.g., in one or more databases) all of storyline elements triggers (described below), criteria information, trigger settings and other delivery information that may be associated with each stored storyline element 108. This trigger information may be used by the backend platform 502 (preferably while collaborating with a storyline mechanism on each device 400) to determine when and where to deliver each storyline element 108 to each participant or group of participants.

Preferably each device 400 may include a system mechanism that may include one or more story or storyline applications, software, script, or program that may allow each device 400 to interface with system to generally receive storyline segment elements 108 (e.g., AR elements, audio, video, etc.) from the backend platform 502 and generally to send information (e.g., GPS data, scanned AR markers, etc.) to the backend platform 502. The story application(s) or mechanism(s) may also provide the functionality required for the system to manage, orchestrate and generally deliver the various storyline segments 106 (including all of the storyline elements 108 that each storyline segment 106 may include) to each participant's device 400 at the desired location and moment in time. In this way, the story mechanism(s) on the backend platform 502 may assist the system to deliver each complete storyline 104 comprising the various storyline segments 106 and elements 108 to each participant in real time. In addition, the storyline mechanism(s) may include other elements such as informative maps of the area (using GPS to show each user where they may be located within the location 110), other media content available on-demand, information on other guided tours that may be available, as well as other information and media.

Thus, as shown, each device 400 may individually be in communication with the backend platform 502.

In one scenario, storyline elements 108 may be delivered to all of the devices 400 simultaneously so that all of the participants may experience the same storyline element(s) 108 at the same time. For example, the system 500 may have group triggers 9310 that may deliver content 108 to all of the devices 400 simultaneously. For example, an operator of the system 500 may initiate a group trigger that may play an audio segment (e.g., an introduction audio file at the onset of the storyline 104) on each of the participant's devices 400 at the same time. In this way, storyline elements 108 that are important for each participant to experience may be delivered to all of the participants substantially simultaneously. In addition, the group triggers may be able to deliver storyline elements 108 to sub-groups of the participants. For example, one group of the total participants may have paid or opted for additional content 108 and may thereby receive content 108 that the other remaining group (who did not pay extra) may not receive.

Scripted Activities

As the participants travel to and engage with each physical location 110 to experience the respective storyline segments 106, scripted activities and content may be delivered or otherwise presented that may include audio/sound 118, video 120, live theater 122, and/or other types of scripted content. As described above, the participants may receive prerecorded audio 118 or video 120 as they travel to the first location 110 (in this case, the path segment from the start to the first physical location may, itself, be considered a location). The audio 118 and/or video 120 may also continue after the participants arrive. In one example, the participants may each have a portable audio delivery device (preferably with headphones) that they may carry with them to receive the audio 118 as they get off the bus and explore the location 110. The audio 118 may tell a dramatic story that may directly relate to the different elements or real world objects 112 of the location 110 that the participants may experience or witness as they explore. The audio 118 may also provide interesting information regarding the location 110 so that the participants may learn and engage with the location 110 more deeply.

In another example, the audio 118 may include elements of the storyline drama 104 such as the voices of characters as they converse, argue or otherwise engage. Other types of sounds, for example, the sound of a crashing wall or of gladiators fighting, may provide additional dramatic effects. Music and sound effects (such as the sounds of a flowing river or of a busy city street) may also be included and may play in the background. As should be appreciated, the audio 118 may contain any type of audio content, sounds, information or other types or combination of types of sounds and audio, and audio 118 is not limited to the descriptions and examples given above.

Audio 118 may be prerecorded and/or live audio 118, or a combination thereof. Live audio that may be transmitted from its source in real time to the participants' devices. In the case of live audio, the audio 118 may include a narration from a narrator, audio taken from a live performance (such as the live theater elements 122 described below) or from some other live source of audio or sounds.

Live theater 122 may also be presented to the participants at the various locations 110. As the participants explore the locations 110, live characters may enact scripted scenes around the participants or otherwise at the locations 110 to further embellish or enhance the storyline 104. In one example, a historical street may be filled with street vendors comprising actors dressed in costumes appropriate for the time period and plotline of storyline 104. In another example, a historical scene (e.g., the assassination of Julius Caesar) may be re-enacted in close proximity to the participants in order to heighten the drama of storyline 104. In another example, the characters may engage directly with the participants to make them a part of the scene. The characters may ask for assistance from the participants, may ask them questions, or may otherwise engage with them to create an environment of real time live action interactivity. Note that the live theater 122 may include any type of live theater, acting, dialog, interaction or any other type or combination of types of live acting 122, and is not limited to the descriptions and examples given above.

The scripted elements may also include improvised elements that may not necessarily be scripted, but that may be created, performed and/or delivered dynamically as the storyline 104 advances. For example, the characters that may perform the live theater 122 may interact with the participants during the performance, and may have the ability to customize the content to the specific participants he/she may be interacting with to increase the dramatic effect of the performance. In a simple example, a character may ask a participant for their name and may use their name as a part of the performance. In another example, a character may improvise the creation of a new character for a child to perform (e.g., the child may be asked to be the character's helper on a mission) in order to include the child in a fun adventure during the storyline 104. It can be seen that any type of improvisation may be included in the live theater elements 122, and that the examples listed above do not limit the scope of the current invention. Note also that portions or all of the live theater 122 may be improvised content.

Augmented Reality (AR)

Augmented reality (AR) generally relates to the integration of digital information with a user's environment in real time. Live real-time views of a real-world environment with real world objects may be "augmented" with digital sensory inputs such as animation 128, video 130, audio 132, graphics 134, text 136, haptic, GPS data and other types of elements. The viewing of the augmented environment may be direct or indirect and may include the use of a digital AR viewing device such as a smartphone, tablet computer, or other types of AR viewing devices (note that smartphones and tablet computers may require an AR app or mechanism in order to provide AR viewing).

An AR viewing device (e.g., device 400 in FIGS. 4A-4B) preferably includes one or more cameras, one or more displays, GPS or other location determining functionality, and AR processing software, applications or mechanisms. Network connectivity (e.g., Internet connectivity) may also be preferable in devices 400. As known in the art, the user may position the AR viewing device 400 such that one of the device's camera may capture a view (e.g., video or still images) of the environment in front of the user and display the view in real time on the display of the device 400. Generally speaking, the AR software may then augment the view of the environment by superimposing virtual images into the view that may generally appear to be native elements of the environment.

There are multiple types of augmented reality (AR), including but not limited to:

1. Superimposition Based AR: Superimposition based augmented reality may partially or fully replace the original view of an environment with a newly augmented view of that same environment. A user may use an AR viewing device 400 (such as a smartphone equipped with an AR app, a display and a camera) to view the superimposed AR environments. The user may engage the camera on the smartphone 400 to view the environment in front of him/her. Accordingly, the environment may then be displayed on the display. The AR app may then superimpose digital images (also referred to as virtual images or objects) such as characters, objects or text into the view of the real-world environment such that the virtual objects or characters may appear to actually exist in the environment. Object recognition may play a vital role in superimposition AR in order to properly identify real world objects that may then be augmented.

2. Markerless AR: Markerless AR (also referred to as location-based AR, position-based AR, or GPS AR), may use a GPS mechanism, a digital compass, a velocity meter, an accelerometer or other component embedded in an AR viewing device 400 to overlay data into the view of the environment based on the user's location. For example, a markerless AR app on a smartphone 400 may identify the physical location and coordinates of the participant and then overlay mapping directions, names of nearby stores or businesses, and other types of useful location-centric information onto the view of the environment (e.g., in a busy downtown area) for the participant to view.

3. Marker Based AR: Marker-based AR (also referred to as image recognition) may use an AR viewing device 400 and a type of visual marker, such as a QR/2D code, to produce an AR result only when the marker is sensed by a reader engaged with the AR viewing device 400. The marker may be a distinct but simple pattern (e.g., QR code) that may be distinguished from any real world object in the vicinity. The code, position and orientation of the marker may be read and calculated, and the respective AR content and/or information may then be overlaid the marker. For example, a marker may be placed on the wall in a museum such that when it is viewed with an AR viewing device 400, the particular marker may be replaced by a specific painting that may then appear to be actually hanging on the wall in the location of the marker.

4. Projection Based AR: Projection based AR may project artificial light onto real world surfaces and then sense a human interaction (e.g., touch) of that projected light. The AR viewing device 400 may differentiate between an expected (or known) projection and the altered projection caused by the user's interaction. Once an interaction with the projected light may be detected, the AR viewer 400 may trigger an AR event (such as a superimposition based AR event) or any other type of event that may or may not be AR related (such as the commencement of a live performance). Projection based augmented reality may also utilize laser plasma technology to project three-dimensional interactive holograms into mid-air.

The system 500 may include the ability to create and deploy all of the types of augmented reality technologies listed above. In addition, it should be noted that the system 500 may also include any type of AR technology that may not be listed above but that may be used to provide content to the storyline 104, and that the list above does not limit the scope of the system 500 or the storyline 104. Also, it should be noted that the storyline 104 may include elements of each of the AR technologies listed above, as well as elements of other types of AR technologies that may not be listed.

In one example, the participants may view a physical location 110 through an AR viewing device 400 (e.g., a smartphone with an AR viewing app) as they explore the location 110. The GPS component within the smartphone 400 may track the location/coordinates of the participant within the location 110, and may deliver AR content accordingly. For example, when the participants first arrive at the location 110, the system 500 may recognize this occurrence and deliver a corresponding set of superimposition based AR elements into the augmented view of the environment in order to provide initial background information regarding the specific location 110. For example, the system 500 may overlay text 136 about the site 110, graphics 134, audio 132, video 130, animations 128, and other types of elements into the AR environment.

Then, when the participant reaches a new and specific coordinate within the location 110, the system 500 may present a new set of AR elements that may pertain to the plotline of the storyline 104 pertaining to the new location 110. The system 500 may utilize object recognition to recognize and process the view of the real world objects at the particular location within the environment 110. The system 500 may then place or superimpose the AR elements into the environment in association with the recognized real world objects. In one example of this, a participant may reach a specific location where ancient treasures were once located and/or displayed centuries ago. Upon reaching this location 110, the system 500 may superimpose virtual images of the treasures within the viewed environment such that the treasures appear to actually exist as they did in ancient history. Animations 128, graphics 134, video 130 and text 136 may also appear within the augmented environment that may provide more information about the treasures and the history of the location 110.

The system 500 may also use marker based AR with markers placed in various positions within the location 110 such that when the markers are viewed by the participants using the AR viewing devices 400, the markers may be replaced with specific virtual images pertaining to the storyline 104. Continuing with the example above, a marker in a particular position within the location 110 may be read by the participant's AR viewing device 400, and may be replaced with an image of the treasure (e.g., a chest of gold coins) on the display of the device 400.

In another example, the system 500 may also utilize projection based AR to recognize when a participant may attempt to touch a piece of the treasure (e.g., a large jewel or golden vase) and upon sensing the interaction may sound an alarm (emitted by the AR viewing device 400) within the AR environment accompanied by the sound of guards rushing to the scene. The system 500 may then present guide signage within the augmented environment to help the participants escape the rushing guards and to effectively lead them to the next scene or setting.

It can be seen that the above example may include elements of 1) superimposition based AR, 2) markerless AR, 3) marker based AR and 4) projection based AR. Note also that other elements and other types of AR may also be included, and that the examples described are meant for demonstration and conceptual purposes and do not limit the scope of the system 500 or the storyline 104.

Devices, Backend and Triggers

Recall that storyline elements 108 may be delivered to participants' devices 400 (e.g., from backend platform 502) based on storyline event triggers 140 that may occur during a storyline experience.

The backend platform 502 may include a storyline trigger that may be a particular location (e.g., a GPS coordinate or the like). The GPS coordinate may represent a particular location 110 that, when a participant (or group of participants) may arrive at the particular coordinate, the backend platform 502 may be triggered to deliver a particular storyline element 108 to the particular participant (or group of participants). A location mechanism (e.g., a GPS mechanism) on each device 400 may continually send the device's current location to the backend platform 502, and the backend platform 502 may continually monitor the data to determine, in real time, when the device is at a particular location. When the device's location matches a trigger location, then the backend platform 502 may be triggered to deliver the storyline element associated with the particular trigger location. For instance, when a participant disembarks a bus and begins walking towards a location, the participant may pass through a location coordinate that may trigger the backend platform 502 to deliver a particular audio recording 118 to the participant as they are walking. Note that more than one storyline element 108 may be associated with a particular event trigger such that more than one storyline element 108 may be delivered upon the trigger (e.g., audio and AR content may both be delivered simultaneously upon a particular trigger).

A device may be considered to be at a location when the device is sufficiently near the location, based on some predetermined criteria. The criteria may be based, at least in part, on the amount of resolution or granularity required for the location. For example, for some storyline elements, the location may be anywhere within a 100 meters of a real-world object, whereas for other storyline elements, the location may be considered anywhere within 10 meters of a particular coordinate. As should be appreciated, devices may have different location resolutions and the resolution of the location information may vary, depending on where the device is. The determination of when a device is considered to be at a particular location preferably accounts for the accuracy and resolution of the device's location mechanisms.

As described in the Augmented Reality (AR) section of this description, a trigger may also be an event associated with AR content. For example, a participant may scan an AR marker with their device 400 and the system 500 may be triggered to replace the marker image on the display of the user's device 400 with an image (or images) of one or more virtual objects. In this case, the scanning of the marker may represent or correspond to the event trigger.

Event triggers may also be based on Boolean expressions (e.g., AND, OR and NOT) that may operate on a combination of different triggers. For example, a trigger may require for two or more criteria to be true in order to activate, or for one criterion to be true and other criteria to be false. For instance, a trigger may require that a participant (or the participant's device) be located at a particular location and be finished listening to a particular audio recording 118. In another example, an event trigger may activate if a participant is located at a first location OR is located at a second distinct location. In another example, an event trigger may activate when a participant is located at a particular location but is NOT viewing a particular video. It can be seen that any string or collection of Boolean expressions and operators may be used to construct any type of storyline event trigger, and that the string or collection may include one or more Boolean expressions operating on one or more event triggers. As should be appreciated, different and/or other types of advanced trigger criteria or logic (e.g., artificial intelligence) may also be used.

Entire storyline segments may be delivered in a dynamic fashion (not necessarily sequentially) and event triggers may determine the order of the storyline segments. For example, depending on an interaction with a group of participants, an event trigger may cause the group to visit a particular physical location (and thereby experience its associated storyline segment) instead of a different physical location. It can be seen that this may allow multiple tour groups to visit multiple physical locations in an offset manner. That is, one tour group may be located at a first physical location 110-1 while experiencing the storyline segment 106-1 that may be associated with the physical location 110-1, while another tour group may be at a different physical location 110-2 while experiencing its associated storyline segment 106-2. After the tour groups have experienced their respective storyline segments 106, event triggers may be activated that may then cause the tour groups to switch locations and thereby experience respective storyline segments.

Figure 6:
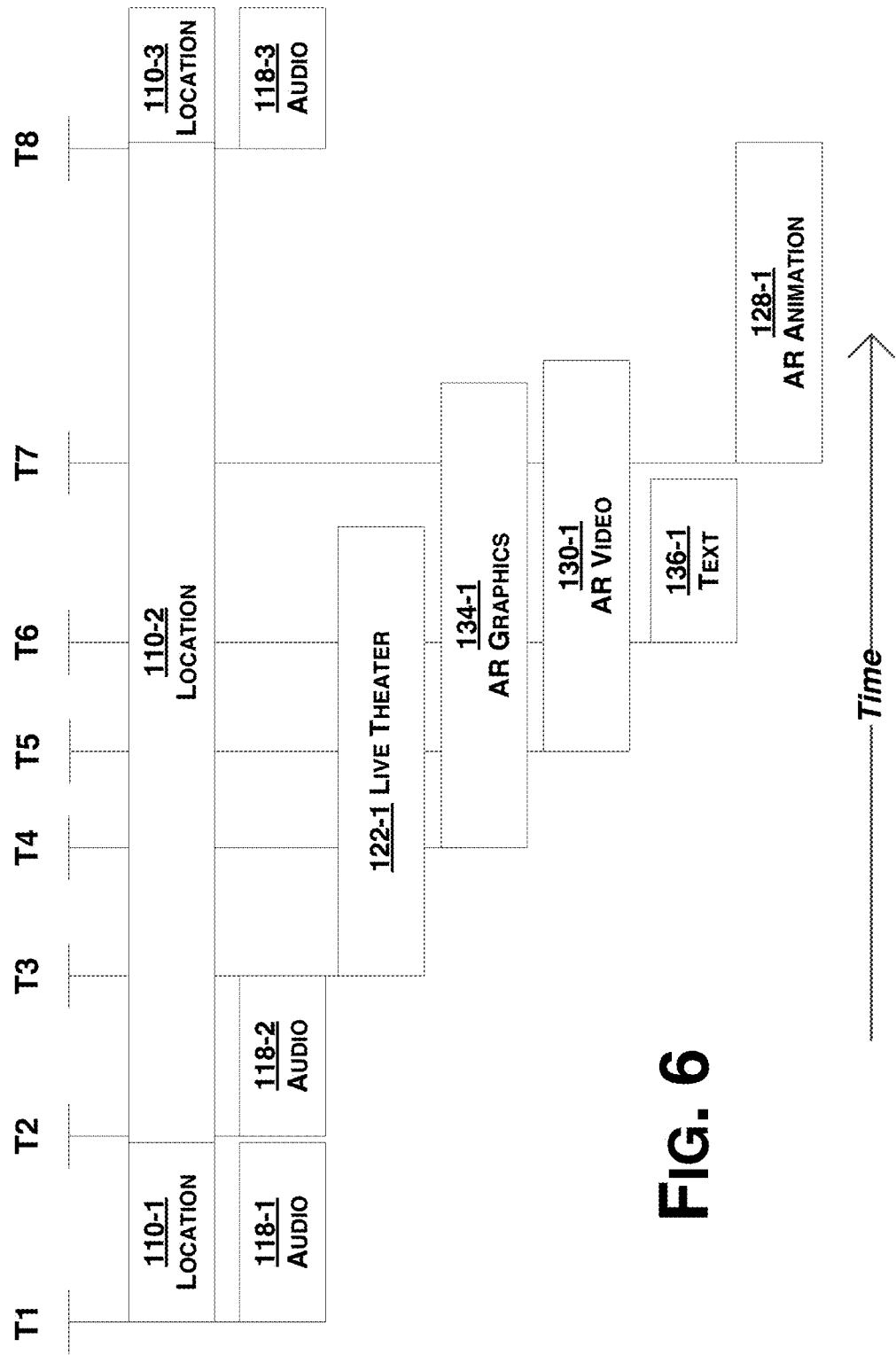
FIG. 6 depicts aspects of an example of a storyline using event triggers according to exemplary embodiments hereof.

An example of a storyline using event triggers is given now with reference to FIG. 6. In this example, the segment 106 may include eight storyline element triggers (T1 . . . T8) as follows:

Trigger T1: The trigger T1 may be activated when the participant(s) travel by bus to a new location. The bus travel is represented as location 110-1 in the drawing in FIG. 6. A location mechanism (e.g., GPS mechanism or the like) within each participant's device 400 may cause the activation of the trigger T1 or an operator of the system 500 (e.g., a tour guide) may manually activate the trigger through a control console or application or the like. The event may also be triggered by other criteria. As shown, the trigger T1 may trigger the delivery of audio element 118-1 to the participants' devices 400 while they are on the bus.

Trigger T2: The trigger T2 may be activated when the participant(s) arrive at location 110-2 or by other criteria. As shown, trigger T2 may trigger the delivery of audio element 118-2 to the participants' devices 400.

Trigger T3: The trigger T3 may trigger the performance of a live theater element 122-1. The trigger T3 may be activated by a GPS coordinate, by the ending of audio element 118-2, or by any other event criteria.

Trigger T4: The trigger T4 may trigger the delivery of AR graphics 134-1 into an augmented reality environment of location 110-1 that may be viewed on the displays of the participants' devices 400. Note that in this example the AR graphics 134-1 may run concurrently and in parallel with the live theater element 122-1. The trigger T4 may be triggered, e.g., at a particular moment in time (t) relative to the start of the live theater performance 122-1, e.g., three minutes after the live theater performance 122-1 begins, or by other trigger criteria.

Trigger T5: The trigger T5 may trigger the AR video 130-1 into an augmented reality environment of location 110-1 that may be viewed on the participants' devices 400. In this example the AR video 130-1 may run concurrently and in parallel with the live theater element 122-1 and the AR graphics element 134-1. The trigger T5 may be triggered, e.g., by a GPS coordinate, at a particular moment in time (t) relative to the start of another event, or by other criteria.

Trigger T6: The trigger T6 may trigger the delivery of AR text 136-1 that may be augmented into the environment 110-1 as viewed on the displays of the participants' devices 400. In this example the AR text 136-1 may run concurrently with the AR video 130-1, the live theater element 122-1 and the AR graphics element 134-1. The trigger T6 may be triggered, e.g., at a particular moment in time (t) relative to the other AR elements in motion, by a GPS coordinate, or by other trigger criteria.

Trigger T7: The trigger T7 may trigger the delivery of AR animation element 128-1 that may be augmented into the view of location 110-1. In this example the AR animation element 128-1 may run concurrently and in parallel with the AR graphics element 134-1 and the AR video element 130-1, but not with the live theater element 122-1 or the AR text element 136-1. The trigger T7 may be triggered, e.g., at a particular moment in time (t) relative to the other AR elements in motion, by a GPS coordinate, or by other trigger criteria.

Trigger T8: The trigger T8 may trigger the delivery of audio component 118-3 and may commence when the participants are back on the bus (denoted as location 110-3) to travel to a new location 110. Other criteria may also be used to activate trigger T8.

As should be appreciated, the example demonstrated in FIG. 6 does not limit the scope of the system 500 or the storyline 104 and its storyline elements 108 in any way, and has been presented to further the understanding of the system 500, the storyline segments 106, the storyline elements 108, the storyline element triggers, as well as other elements and components of the story system 500. The example is also meant to further the understanding of how the various components and triggers may be orchestrated, correlated, linked and coordinated to deliver the storyline elements 108 in a choreographed fashion so that a complete storyline 104 (and story 102) may be experienced by the participants.

Thus, a person of ordinary skill in the art, upon reading this specification, will appreciate and understand that the system 500 may deliver any type of storyline element 108 upon any type of event trigger at any location 110 to one or more, or any of the participants.

In another scenario, the backend platform 502 may provide (e.g., serve) storyline content 108 to each device 400 separately such that each user may experience storyline elements 108 at their own pace and in their own sequence, depending on the triggers that they may activate. This may result in a unique and customized experience of the storyline 104 for each different user, all within the general realm of the storyline 104.

For this scenario, it may be preferable that each user's device 400 may be uniquely identifiable by the backend platform 502 so that the communication between each unique device 400 and the backend platform 502 may be independent, distinct and exclusive when desired. In this way, the backend platform 502 may identify each device 400 individually, receive information from each identified device 400 (e.g., GPS data 114 to activate triggers) and deliver the appropriate storyline content 108 to each identified device 400.

In one scenario, each user may be registered with the system 500 and with the backend platform 502, and as such, may each possess a unique account with the system 500. Each account may include account information including a unique identifier that may allow the system 500 (e.g., through the backend platform 502) to identify each particular device 400. The unique identifier may be, e.g., a unique IP address, a serial number, a code, a name or any other type of unique identifier that may be stored in a database on the backend platform 502 and used to identify each individual device 400. Each user may be required to register with the system 500 in order to create such an account, or alternatively, an operator of the system 500 may create the accounts for the users.

In another scenario, the accounts may not be necessary and the backend platform 502 may identify each device 400 through an application on each device 400. When the users participate with the system 500, the application on each device 400 may automatically communicate its unique identifier to the backend platform 502 such that the backend may establish an exclusive connection with the particular device 400.

In one example, a particular user may be the first to arrive at a particular location that may activate a corresponding trigger, and may therefore receive the resulting storyline element prior to the other participants. The backend platform 502 may recognize and identify the particular user that triggered the event, and may deliver the content 108 only to that particular user (i.e., to that user's device). In this way, each user may experience the storyline 104 at a different pace, or even in a different sequence. Different sequences of storyline events 108 may occur when different users venture in different directions at a particular location 108, pass through different locations (or coordinates) that may activate different triggers, and thereby receive different storyline elements 108. Other scenarios may also cause the participants to experience the storyline elements 108 in distinctly different sequences.

For some triggers, for example triggers that may include Boolean operators, the backend platform 502 may generally track the storyline elements 108 that each user may have experienced and/or track each user's unique position within the storyline 104. In this way, the system 500 may use this information to resolve the Boolean based triggers. This may be used to provide a user with different experiences at the same location if they visit that location multiple times. In addition, the backend platform 502 may store variables within its database that may signify the state or position of each participant within the storyline 104. In any event, the backend may generally have the ability to determine the exact storyline elements 108 to be delivered to each unique participant upon the activation of any types of triggers that each or any participant may activate.

Accordingly, it is understood that the system 500 may support the delivery of storyline elements 108 to a multitude of users (or devices) simultaneously and in real time, and that the same storyline elements 108 may be delivered to all of the multitude of users (or devices) simultaneously, that different and distinct storyline elements 108 may be delivered to less than the entire multitude of users simultaneously, that different and distinct storyline elements 108 may be delivered individually to distinct users at different moments in time, or any combination thereof.

It should also be noted that devices 400 may include some or all of the functionality described above with relation to the backend platform 502 such that the devices 400 may have the ability to perform some or all of the functionalities described without the use of the backend platform 502. For example, some or all of the media content and the trigger information may be stored on each device 400 such that the device 400 may receive and identify the event triggers and deliver the content to the participant accordingly. For instance, the device's internal location mechanism(s) may identify when a participant may be located at a particular location that may trigger a particular storyline element 108, and the device itself may identify and execute the trigger and the delivery of the content 108. It can be seen that the device 400 may perform any or all of the functionalities described above with relation to backend platform 502 without the need for backend platform 502.

Real Time

Those of ordinary skill in the art will realize and understand, upon reading this description, that, as used herein, the term "real time" means near real time or sufficiently real time. It should be appreciated that there are inherent delays in electronic components and in network-based communication (e.g., based on network traffic and distances), and these delays may cause delays in data reaching various components. Inherent delays in the system do not change the real time nature of the data. In some cases, the term "real time data" may refer to data obtained in sufficient time to make the data useful for its intended purpose.

Although the term "real time" may be used here, it should be appreciated that the system is not limited by this term or by how much time is actually taken. In some cases, real-time computation may refer to an online computation, i.e., a computation that produces its answer(s) as data arrive, and generally keeps up with continuously arriving data. The term "online" computation is compared to an "offline" or "batch" computation.

Synchronous

As used herein, including in the claims, the term "synchronous" (or "synchronously") with respect to multiple actions, generally means that the actions occur at the same time or at substantially the same time. Similarly, as used herein, including in the claims, the term "simultaneous" (or "simultaneously") with respect to multiple actions, generally means that the actions occur at the same time or at substantially the same time.

As should be appreciated, there are inherent delays in electronic components and in network-based communication. Inherent delays in the system do not change the synchronous nature of actions. In some cases, the term "synchronous" (or "synchronously") with respect to multiple actions may refer to actions performed in sufficient time to make the actions useful for their intended purpose. For examples, content delivered to multiple devices as substantially the same time is considered to be synchronously delivered.

Computing

The applications, services, mechanisms, operations, and acts shown and described above are implemented, at least in part, by software running on one or more computers.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 7:
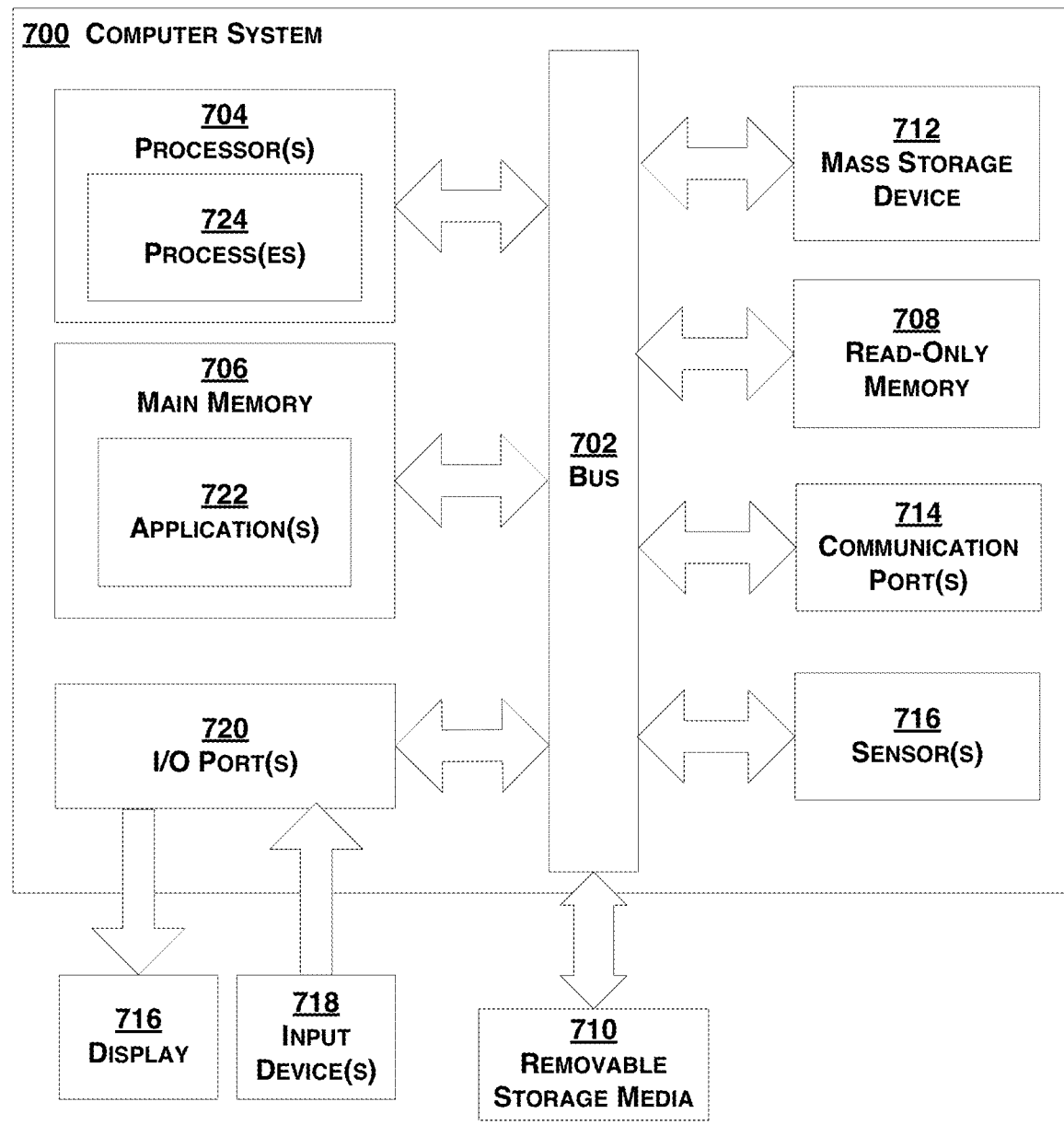
FIG. 7 depicts aspects of computing according to exemplary embodiments hereof.

FIG. 7 is a schematic diagram of a computer system 700 upon which embodiments of the present disclosure may be implemented and carried out.

According to the present example, the computer system 700 includes a bus 702 (i.e., interconnect), one or more processors 704, a main memory 706, read-only memory 708, removable storage media 710, mass storage 712, and one or more communications ports 714. Communication port(s) 714 may be connected to one or more networks (not shown) by way of which the computer system 700 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 704 can be any known processor, such as, but not limited to, an Intel® Itanium® or Itanium 2® processor(s), AMD® Opteron® or Athlon MP® processor(s), or Motorola® lines of processors, and the like. Communications port(s) 714 can be any of an Ethernet port, a Gigabit port using copper or fiber, or a USB port, and the like. Communications port(s) 714 may be chosen depending on a network such as a Local Area Network (LAN), a Wide Area Network (WAN), or any network to which the computer system 700 connects. The computer system 700 may be in communication with peripheral devices (e.g., display screen 716, input device(s) 718) via Input/Output (I/O) port 720.

Main memory 706 can be Random Access Memory (RAM), or any other dynamic storage device(s) commonly known in the art. Read-only memory (ROM) 708 can be any static storage device(s) such as Programmable Read-Only Memory (PROM) chips for storing static information such as instructions for processor(s) 704. Mass storage 712 can be used to store information and instructions. For example, hard disk drives, an optical disc, an array of disks such as Redundant Array of Independent Disks (RAID), or any other mass storage devices may be used.

Bus 702 communicatively couples processor(s) 704 with the other memory, storage and communications blocks. Bus 702 can be a PCI/PCI-X, SCSI, a Universal Serial Bus (USB) based system bus (or other) depending on the storage devices used, and the like. Removable storage media 710 can be any kind of external storage, including hard-drives, floppy drives, USB drives, Compact Disc—Read Only Memory (CD-ROM), Compact Disc—Re-Writable (CD-RW), Digital Versatile Disk—Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 706 is encoded with application(s) 722 that support(s) the functionality as discussed herein (the application(s) 722 may be an application(s) that provides some or all of the functionality of the services/mechanisms described herein). Application(s) 722 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 704 accesses main memory 706 via the use of bus 702 in order to launch, run, execute, interpret or otherwise perform the logic instructions of the application(s) 722. Execution of application(s) 722 produces processing functionality of the service related to the application(s). In other words, the process(es) 724 represent one or more portions of the application(s) 722 performing within or upon the processor(s) 704 in the computer system 700.

It should be noted that, in addition to the process(es) 724 that carries(carry) out operations as discussed herein, other embodiments herein include the application 722 itself (i.e., the un-executed or non-performing logic instructions and/or data). The application 722 may be stored on a computer readable medium (e.g., a repository) such as a disk or in an optical medium. According to other embodiments, the application 722 can also be stored in a memory type system such as in firmware, read only memory (ROM), or, as in this example, as executable code within the main memory 706 (e.g., within Random Access Memory or RAM). For example, application(s) 722 may also be stored in removable storage media 710, read-only memory 708, and/or mass storage device 712.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

CONCLUSION

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used herein, including in the claims, the term "portion" means some or all. So, for example, "A portion of X" may include some of "X" or all of "X". In the context of a conversation, the term "portion" means some or all of the conversation.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

As used herein, including in the claims, the term "automatic," with respect to an action, generally means that the action occurs with little or no human control or interaction. The term "automatic" also includes the case of no human control or interaction. Thus, e.g., the term "triggered automatically" means "triggered with little or no human control or interaction," and includes the case "triggered with no human control or interaction."

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.") and the like, is merely intended to better illustrate the invention and does not indicate a limitation on the scope of the invention unless specifically so claimed.

Any acts described in the specification may be performed in any order or simultaneously, unless the context clearly indicates otherwise.

All of the features and/or acts disclosed herein can be combined in any combination, except for combinations where at least some of the features and/or acts are mutually exclusive. In particular, preferred features of the invention are applicable to all aspects of the invention and may be used in any combination.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

Thus are provided systems and methods for delivering multimedia content to multiple participants at one or more physical locations.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

Although certain presently preferred embodiments of the invention have been described herein, it will be apparent to those skilled in the art to which the invention pertains that variations and modifications of the described embodiments may be made without departing from the spirit and scope of the invention.

I claim:

1. A framework for presenting aspects of a story to multiple participants, the multiple participants each having at least one device,
 the story having one or more storylines, each storyline comprising one or more segments, each segment comprising one or more elements, each of the one or more elements comprising (i) a physical location; (ii) actions; and (iii) one or more event triggers, wherein at least one of the elements includes or is associated with one or more scripted activities, wherein the one or more scripted activities comprise one or more of: (i) audio activities; and/or (ii) video activities; and/or (iii) live acting theater,
 the framework comprising one or more computer systems storing information about the story and interacting with the at least one device of at least some of the multiple participants to synchronously deliver aspects of at least one of the storylines in real time to at least some of the multiple participants using the at least one device, wherein the aspects of the at least one of the storylines are delivered to multiple devices associated with the participants based on one or more event triggers,
 wherein at least some of the one or more event triggers are location-based, wherein a particular location-based event trigger is associated with a particular physical location, and wherein the particular location-based event trigger is triggered based on (i) at least a certain percentage of the multiple participants; and/or (ii) a plurality of participants in the multiple participants being within a predetermined distance from the physical location; and/or (iii) fewer than all participants of the multiple participants are within the predetermined distance from the physical location.

2. The framework of claim 1, wherein at least one of the elements includes or is associated with one or more augmented reality (AR) content and/or one or more virtual reality (VR) content, wherein the one or more AR content and/or the one or more VR content comprises one or more of: (i) animation content; (ii) video content; (iii) audio content; (iv) graphics content; and (v) text content.

3. The framework of claim 1, wherein the particular location-based event trigger is triggered manually or automatically based on information provided by the one or more computer systems.

4. The framework of claim 1, wherein at least some of the one or more event triggers are evaluated on a device.

5. The framework of claim 1, wherein at least some of the one or more event triggers are evaluated on the one or more computer systems.

6. The framework of claim 1, wherein the one or more computer systems maintains information about presentation of the aspects of the story to the multiple participants, and wherein information maintained by the one or more computer systems is used to control delivery of the aspects of the at least one of the storylines.

7. The framework of claim 6, wherein the information maintained by the one or more computer systems includes information about which aspects of the story have been delivered to which participants of the multiple participants.

8. The framework of claim 1, wherein the one or more computer systems manages delivery of the aspects of the story to the participants in the multiple participants simultaneously.

9. A method, in a framework for presenting aspects of a story to multiple participants, the multiple participants having at least one device,
 the story having one or more storylines, each storyline comprising one or more segments, each segment comprising one or more elements, each of the one or more elements comprising (i) a physical location; (ii) actions; and (iii) one or more event triggers, wherein at least one of the elements includes or is associated with one or more scripted activities, wherein the one or more scripted activities comprise one or more of: (i) audio activities; and/or (ii) video activities; and/or (iii) live acting theater,
 the framework comprising a one or more computer systems storing information about the story and interacting with the at least one device of the multiple participants,
 the method comprising:
 (A) evaluating one or more event triggers; and
 (B) in response to the evaluating, synchronously delivering aspects of at least one of the storylines through a plurality of the multiple participants, wherein the delivering comprises: delivering one or more scripted activities, wherein the aspects of at least one storyline are delivered in real-time to multiple devices associated with the at least some of the participants; and
 (C) repeating acts (A) and (B) for multiple event triggers, wherein at least some of one or more event triggers are location-based, wherein a particular location-based event trigger is associated with a particular physical location, and wherein the particular location-based event trigger is triggered based on (i) at least a certain percentage of the multiple participants; and/or (ii) a plurality of participants in the multiple participants being within a predetermined distance from the physical location; and/or (iii) fewer than all participants of the multiple participants are within the predetermined distance from the physical location.

10. The method of claim 9, wherein at least one of the elements includes or is associated with augmented reality (AR) content and/or virtual reality (VR) content, and wherein the delivering comprises:
 delivering at least some of the AR content and/or the VR content, wherein the AR content and/or the VR content comprises one or more of: (i) animation content; (ii) video content; (iii) audio content; (iv) graphics content; and (v) text content.

11. The method of claim 9, wherein the particular location-based event trigger is triggered based on information provided by the one or more computer systems.

12. The method of claim 9, wherein at least some of the one or more event triggers are evaluated on a device.

13. The method of claim 9, wherein at least some of the one or more event triggers are evaluated on the one or more computer systems.

14. The method of claim 9, wherein at least one of the one or more event triggers is triggered manually.

15. The method of claim 9, wherein the one or more computer systems maintains information about presentation of the aspects of the story to the multiple participants, wherein the information maintained by the one or more computer systems includes information about which aspects of the story have been delivered to which participants of the multiple participants, wherein the information maintained by the one or more computer systems is used to control delivery of the aspects of the at least one of the storylines.

16. The method of claim 9, wherein the one or more computer systems manages delivery of the aspects of the story to the participants in the multiple participants simultaneously.

17. The method of claim 9, wherein the repeating in (C) occurs at multiple physical locations.

18. A non-transitory computer-readable medium with one or more computer programs stored therein that, when executed by one or more processors of a device, cause the one or more processors to perform the operations of the method claim 9.

* * * * *